(12) United States Patent
Chinn

(10) Patent No.: US 9,241,850 B2
(45) Date of Patent: Jan. 26, 2016

(54) LITTER SUPPORT ASSEMBLY FOR MEDICAL CARE UNITS HAVING A SHOCK LOAD ABSORBER AND METHODS OF THEIR USE

(75) Inventor: Robert Chinn, Cumming, GA (US)

(73) Assignee: Ferno-Washington, Inc., Wilmington, OH (US)

( * ) Notice: Subject to any disclaimer, the term of this patent is extended or adjusted under 35 U.S.C. 154(b) by 322 days.

(21) Appl. No.: 13/602,689

(22) Filed: Sep. 4, 2012

(65) Prior Publication Data
US 2013/0233999 A1 Sep. 12, 2013

Related U.S. Application Data

(60) Provisional application No. 61/530,783, filed on Sep. 2, 2011.

(51) Int. Cl.
*A61G 3/08* (2006.01)
*B60P 7/16* (2006.01)
*A61G 3/00* (2006.01)

(52) U.S. Cl.
CPC .............. *A61G 3/0841* (2013.01); *A61G 3/006* (2013.01); *A61G 3/085* (2013.01); *A61G 3/0825* (2013.01); *A61G 3/0866* (2013.01); *B60P 7/16* (2013.01)

(58) Field of Classification Search
CPC ..... A16G 3/006; A16G 3/085; A16G 3/0825; A16G 3/0841; B60P 7/16
USPC .......... 248/562, 567, 581, 602, 613, 616, 631
See application file for complete search history.

(56) References Cited

U.S. PATENT DOCUMENTS

| | | | |
|---|---|---|---|
| 2,216,243 A | * | 10/1940 | Kreidler ........................... 296/19 |
| 3,606,619 A | * | 9/1971 | Stollenwerk ....................... 5/9.1 |
| 3,656,633 A | | 4/1972 | Ostwald |
| 3,666,256 A | | 5/1972 | Ellis et al. |
| 3,724,832 A | | 4/1973 | Ceska |
| 3,771,778 A | | 11/1973 | Muller |
| 3,794,309 A | | 2/1974 | Chrokey et al. |
| 3,840,265 A | * | 10/1974 | Stirling et al. .................. 296/19 |
| 3,876,044 A | | 4/1975 | Kendall et al. |
| 3,882,977 A | | 5/1975 | Watanabe |
| 3,888,531 A | | 6/1975 | Straza et al. |
| 4,200,268 A | | 4/1980 | Wiek |
| 4,275,802 A | | 6/1981 | De Groot et al. |

(Continued)

FOREIGN PATENT DOCUMENTS

DE 688420 C * 2/1940
DE 1541320 A1 * 7/1969

(Continued)

*Primary Examiner* — Terrell McKinnon
*Assistant Examiner* — Eret McNichols
(74) *Attorney, Agent, or Firm* — Dinsmore & Shohl LLP

(57) ABSTRACT

A shock absorbing support arm assembly for a litter support assembly that includes a support arm comprising a first end and a second end opposite the first end, a shock absorbing device disposed at the second end of the support arm, and a litter side shaft engagement mechanism disposed at the first end of the support arm. The support arm assembly may also comprise a mounting bracket connected at the second end of the support arm such that the shock absorbing device is positioned between the mounting bracket and the support arm. The support arm may move along an axis of the shock absorbing device and relative to the mounting bracket and may pivot about the axis relative to the mounting bracket.

10 Claims, 22 Drawing Sheets

(56) References Cited

U.S. PATENT DOCUMENTS

| | | | |
|---|---|---|---|
| 4,353,431 A | 10/1982 | Kirby | |
| 4,378,128 A * | 3/1983 | Holling et al. | 296/19 |
| 4,396,096 A | 8/1983 | De Groot et al. | |
| 4,589,675 A | 5/1986 | Braun et al. | |
| 4,674,607 A | 6/1987 | Franzen | |
| 4,693,317 A | 9/1987 | Edwards et al. | |
| 4,783,025 A * | 11/1988 | Moffett | 244/118.5 |
| 4,817,710 A | 4/1989 | Edwards et al. | |
| 4,962,946 A | 10/1990 | Wright | |
| 4,971,751 A | 11/1990 | David | |
| 4,982,979 A | 1/1991 | Akatsu et al. | |
| 4,995,659 A | 2/1991 | Park | |
| 4,999,777 A | 3/1991 | Schussler et al. | |
| 5,015,009 A | 5/1991 | Ohyama et al. | |
| 5,033,770 A | 7/1991 | Kamimura et al. | |
| 5,037,128 A | 8/1991 | Okuyama et al. | |
| 5,048,861 A | 9/1991 | Takahashi | |
| 5,054,808 A | 10/1991 | Tsukamoto | |
| 5,071,159 A | 12/1991 | Kamimura | |
| 5,074,569 A | 12/1991 | Kawabata | |
| 5,085,459 A | 2/1992 | Sato et al. | |
| 5,087,072 A | 2/1992 | Kawarasaki | |
| 5,098,119 A | 3/1992 | Williams et al. | |
| 5,103,397 A | 4/1992 | Ikemoto et al. | |
| 5,110,152 A | 5/1992 | Jones | |
| 5,133,419 A | 7/1992 | Barrington | |
| 5,134,566 A | 7/1992 | Yokoya et al. | |
| 5,137,299 A | 8/1992 | Jones | |
| 5,160,160 A | 11/1992 | Kawabata | |
| 5,160,161 A | 11/1992 | Tsukamoto et al. | |
| 5,162,995 A | 11/1992 | Ikemoto et al. | |
| 5,174,598 A | 12/1992 | Sato et al. | |
| 5,194,311 A | 3/1993 | Baymak et al. | |
| 5,231,583 A | 7/1993 | Lizell | |
| 5,232,242 A | 8/1993 | Bachrach et al. | |
| 5,299,488 A | 4/1994 | Kadlicko et al. | |
| 5,308,938 A | 5/1994 | Roberts et al. | |
| 5,322,321 A | 6/1994 | Yopp | |
| 5,342,023 A | 8/1994 | Kuriki et al. | |
| 5,369,579 A | 11/1994 | Anderson | |
| 5,372,339 A * | 12/1994 | Morgan | 244/118.5 |
| 5,383,629 A * | 1/1995 | Morgan | 244/118.6 |
| 5,390,891 A | 2/1995 | Hornung et al. | |
| 5,439,075 A | 8/1995 | Skalski et al. | |
| 5,489,115 A | 2/1996 | Osaki et al. | |
| 5,522,221 A | 6/1996 | Kadlicko et al. | |
| 5,551,673 A | 9/1996 | Furusawa et al. | |
| 5,572,425 A | 11/1996 | Levitt et al. | |
| 5,660,411 A | 8/1997 | Yoon | |
| 5,678,847 A | 10/1997 | Izawa et al. | |
| 5,682,980 A | 11/1997 | Reybrouck | |
| 5,743,553 A | 4/1998 | Nagel et al. | |
| 5,758,859 A | 6/1998 | Gonzalez | |
| 5,850,891 A * | 12/1998 | Olms et al. | 182/127 |
| 5,899,288 A | 5/1999 | Schubert et al. | |
| 5,947,458 A | 9/1999 | Rhodes et al. | |
| 6,000,703 A | 12/1999 | Schubert et al. | |
| 6,059,253 A | 5/2000 | Koutsky et al. | |
| 6,102,417 A | 8/2000 | Moore | |
| 6,152,401 A * | 11/2000 | Green | 244/118.6 |
| 6,249,728 B1 | 6/2001 | Streiter | |
| 6,259,982 B1 | 7/2001 | Williams et al. | |
| 6,318,525 B1 | 11/2001 | Vignocchi et al. | |
| 6,412,614 B1 | 7/2002 | Lagrange et al. | |
| 6,467,748 B1 | 10/2002 | Schick et al. | |
| 6,507,778 B2 | 1/2003 | Koh | |
| 6,698,331 B1 | 3/2004 | Yu et al. | |
| 6,871,731 B2 | 3/2005 | Stiller et al. | |
| 6,923,606 B2 * | 8/2005 | Fehrle et al. | 410/46 |
| 7,028,351 B1 * | 4/2006 | Frieder et al. | 5/118 |
| 7,321,816 B2 | 1/2008 | Lauwerys et al. | |
| 7,328,926 B1 * | 2/2008 | Myers et al. | 296/19 |
| 7,342,743 B2 | 3/2008 | Kuwajima | |
| 7,627,408 B2 | 12/2009 | Kim et al. | |
| 7,779,907 B2 | 8/2010 | Wagner et al. | |
| 7,883,133 B2 * | 2/2011 | Chinn | 296/19 |
| 7,959,135 B2 | 6/2011 | Voelkel | |
| 8,276,962 B2 * | 10/2012 | Chinn | 296/19 |
| 8,366,167 B2 * | 2/2013 | Sartin et al. | 296/24.38 |
| 8,382,181 B2 * | 2/2013 | Bourgraf et al. | 296/19 |
| 8,602,475 B2 * | 12/2013 | Fletcher et al. | 296/19 |
| 8,636,154 B2 * | 1/2014 | Chinn | 211/103 |
| 8,714,504 B2 * | 5/2014 | Vuorenoja | 248/285.1 |
| 2002/0063369 A1 | 5/2002 | Huang | |
| 2002/0084658 A1 | 7/2002 | Yamaoto | |
| 2002/0133277 A1 | 9/2002 | Koh | |
| 2002/0168638 A1 | 11/2002 | Schlegel et al. | |
| 2002/0175467 A1 | 11/2002 | Dicus | |
| 2003/0009825 A1 * | 1/2003 | Gallant et al. | 5/81.1 R |
| 2003/0102685 A1 * | 6/2003 | Sioutis | 296/24.1 |
| 2003/0141157 A1 | 7/2003 | Stiller et al. | |
| 2004/0009481 A1 | 1/2004 | Schlegel et al. | |
| 2004/0053317 A1 | 3/2004 | Glinskii | |
| 2004/0140090 A1 | 7/2004 | Mason et al. | |
| 2005/0240326 A1 | 10/2005 | Lauwerys et al. | |
| 2005/0269452 A1 | 12/2005 | Wakefield | |
| 2006/0045647 A1 * | 3/2006 | Verbrugge et al. | 410/77 |
| 2006/0236456 A1 * | 10/2006 | Beale | 5/600 |
| 2007/0113070 A1 | 5/2007 | Lackritz | |
| 2008/0116720 A1 | 5/2008 | Yamaguchi et al. | |
| 2008/0275606 A1 | 11/2008 | Tarasinski et al. | |
| 2009/0047470 A1 | 2/2009 | Kuwajima et al. | |
| 2009/0079155 A1 | 3/2009 | Rehra et al. | |
| 2009/0133977 A1 | 5/2009 | Warren | |
| 2009/0248246 A1 | 10/2009 | Parison et al. | |
| 2010/0000399 A1 | 1/2010 | Barnes et al. | |
| 2010/0152969 A1 | 6/2010 | Li et al. | |
| 2012/0006873 A1 * | 1/2012 | Chinn | 224/545 |
| 2013/0233999 A1 * | 9/2013 | Chinn | 248/581 |

FOREIGN PATENT DOCUMENTS

| | | | |
|---|---|---|---|
| FR | 854558 A | * | 4/1940 |
| FR | 979102 A | * | 4/1951 |
| GB | 421119 A | * | 12/1934 |
| GB | 494389 A | * | 10/1938 |
| GB | 494483 | * | 10/1938 |
| GB | 740483 A | * | 11/1955 |
| WO | PCTUS2010041724 | * | 12/2010 |

* cited by examiner

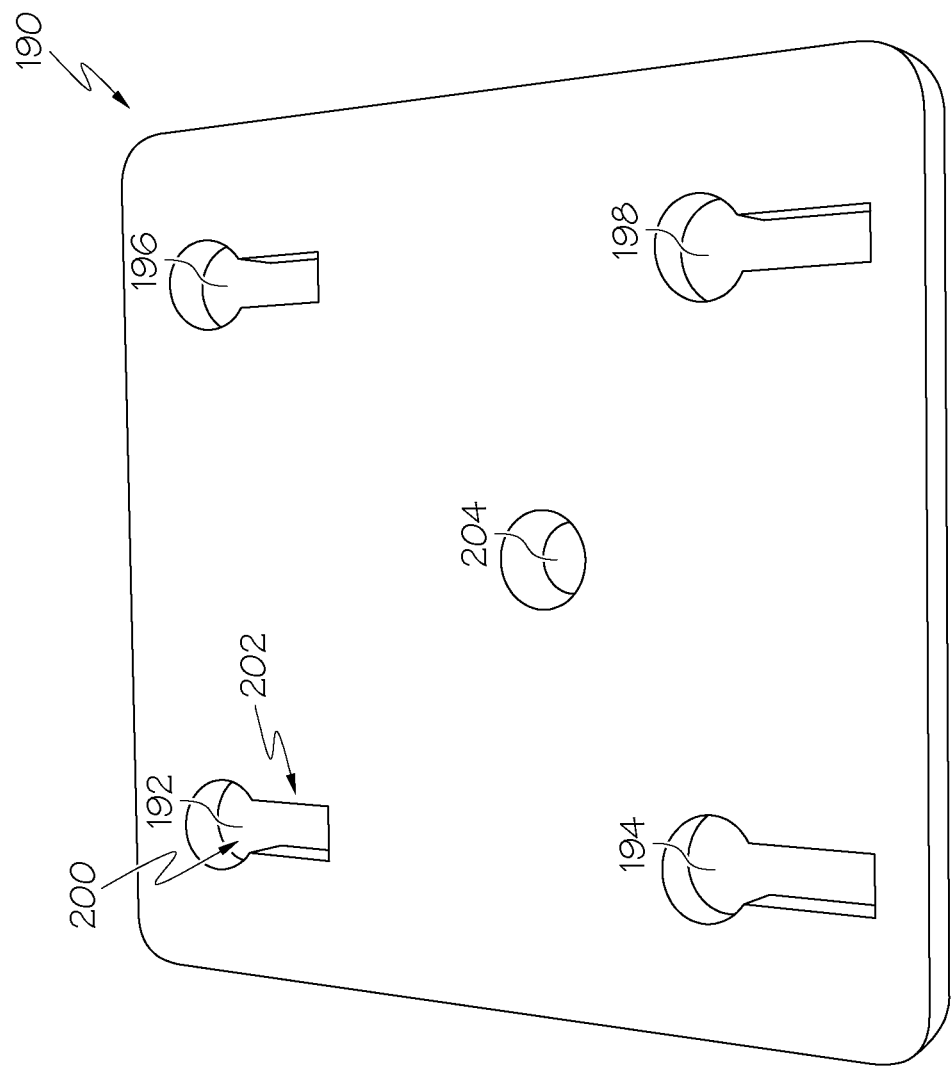

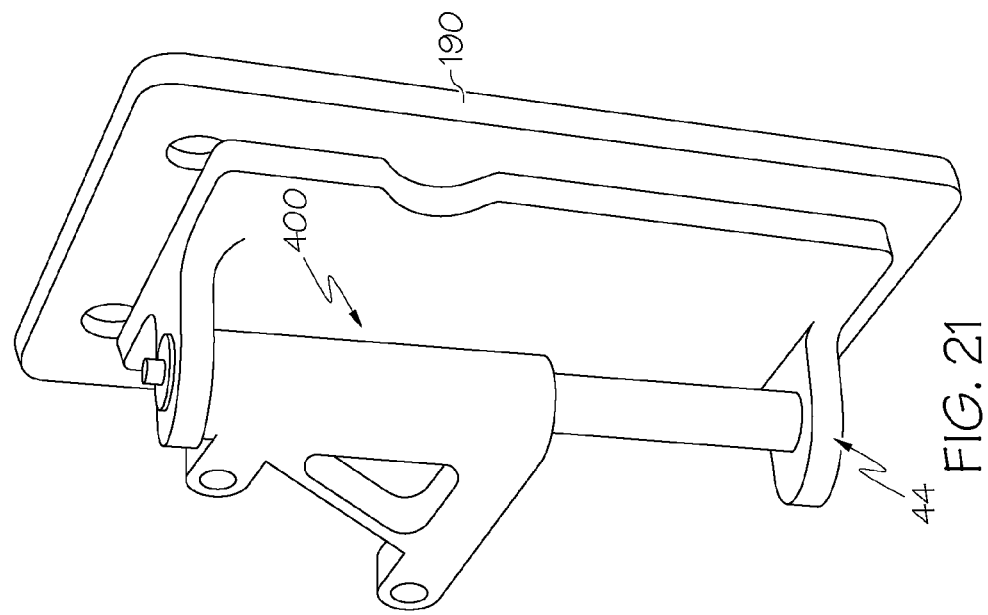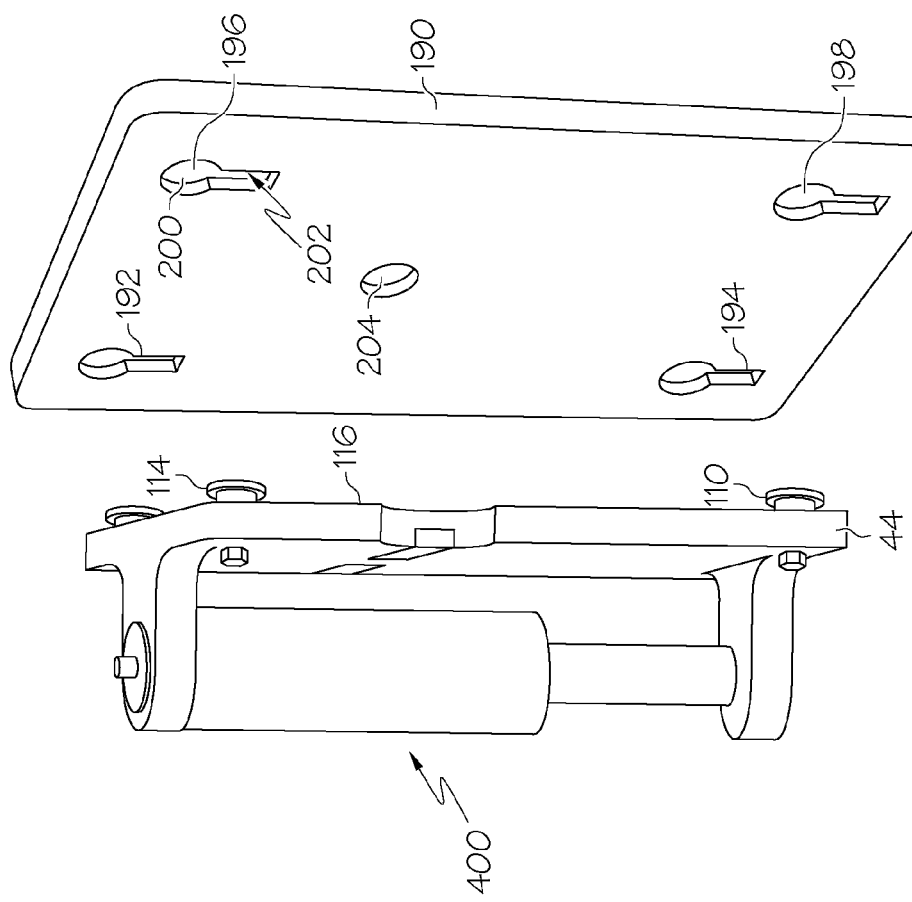

LITTER SUPPORT ASSEMBLY FOR MEDICAL CARE UNITS HAVING A SHOCK LOAD ABSORBER AND METHODS OF THEIR USE

CROSS REFERENCE TO RELATED APPLICATION

This application claims benefit to the Provisional Application Ser. No. 61/530,783 filed Sep. 2, 2011, which is incorporated by reference herein in its entirety.

SUMMARY

As an example, a shock absorbing support arm assembly for a litter support assembly configured to support a patient in a horizontal elevated position. The shock absorbing support arm assembly includes a support arm comprising a first end and a second end opposite the first end, wherein the second end, a shock absorbing device connected to the second end of the support arm and adapted to be disposed between the support arm and a wall of a vehicle, and a first hook disposed at the first end of the support arm.

In another example, a shock absorbing support arm assembly for a litter support assembly configured to support a patient in a horizontal elevated position. The shock absorbing support arm assembly includes a support arm portion comprising a free end and an attachment end, wherein the attachment end is configured to secure the shock absorbing support arm assembly to a mounting bracket, a shock absorbing device connected to said attachment end to dampen shock loads being transferred from a vehicle to the litter support assembly, a first hook disposed at the free end of the support arm portion, the hook being adjustable relative to the arm portion between open and closed positions for securing side shafts of various litters.

In yet another example, a litter support assembly includes a first vertical track comprising a first plurality of incremental securement locations, a first mounting bracket configured to secure to any of the first plurality of incremental securement locations of the first vertical track, a first support arm assembly comprising a first arm portion comprising a first free end, a first attachment end, and a shock absorbing device connected to the first attachment end of the first support arm assembly and adapted to be disposed between the first support arm assembly and a wall of a vehicle; wherein the first attachment end is connected to the mounting bracket, a second vertical track comprising a second plurality of incremental securement locations, the second vertical track being substantially parallel with the first vertical track, a second mounting bracket configured to secure to any of the second plurality of incremental securement locations of the second vertical track, and a second support arm assembly comprising a second arm portion comprising a second free end, a second attachment end, and a shock absorbing device connected to the second attachment end of the second support arm assembly and adapted to be disposed between the second support arm assembly and a wall of a vehicle; wherein the second attachment end is connected to the second mounting bracket.

Features and benefits of the various embodiments of the present disclosure will become apparent from the following description, which includes figures and examples of specific embodiments intended to give a broad representation of the invention. Various modifications will be apparent to those skilled in the art from this description and from practice of the invention. The scope is not intended to be limited to the particular forms disclosed and the invention covers all modifications, equivalents and alternatives falling within the spirit and scope of the invention as defined by the claims.

BRIEF DESCRIPTION OF THE DRAWINGS

While the specification concludes with claims which particularly point out and distinctly claim the invention, it is believed the present disclosure will be better understood from the following description of certain examples taken in conjunction with the accompanying drawings. In the drawings, like numerals represent like elements throughout the several views.

FIG. 19 is a perspective front view of an illustrative mounting plate;

FIGS. 20 and 21 illustrate interaction between the mounting plate of FIG. 19 and the mounting bracket of FIG. 9;

Figure 1:
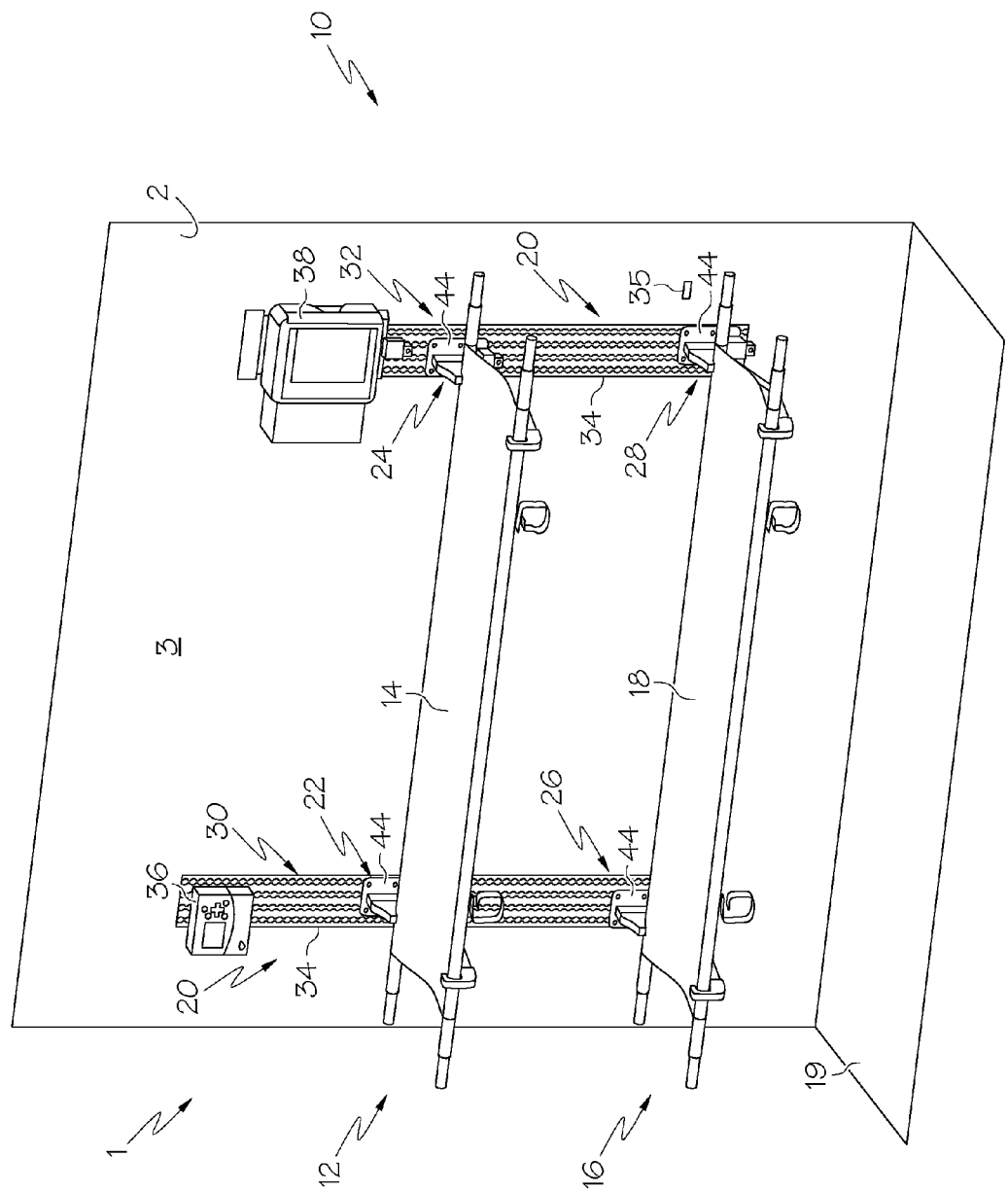
FIG. 1 is a side elevational view of an illustrative litter support assembly in a fully deployed configuration.

The drawings are not intended to be limiting in any way, and it is contemplated that various examples of the disclosure may be carried out in a variety of other ways, including those not necessarily depicted in the drawings. The accompanying drawings incorporated in and forming a part of the specification illustrate several aspects of the present disclosure, and together with the description serve to explain the principles of the disclosure; it being understood, however, that this disclosure is not limited to the precise arrangements shown.

DETAILED DESCRIPTION

The following text sets forth a broad description of numerous different examples of the present disclosure. The description is to be construed as illustrative only and does not describe every possible example since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Litter support assemblies and/or systems are used within portable medical care units (e.g., rescue land vehicles, rescue aircraft, etc.) to support, secure, and hold litters for transporting and treating patients thereon within the portable medical care units. Illustrative portable medical care units may include, but not be limited to, ambulances, trucks, armored vehicles, humvees, other land vehicles, boats, ships, airplanes, helicopters, shipping containers adapted to provide medical services disposed upon vehicles or trailers, or other emergency and/or support vehicles.

During operation of the vehicles, the vehicles may experience turbulence, impacts, or other shock loads (e.g., wrecks, explosions, sudden drops in altitude, etc.). As set forth above, the litters, when connected to and/or supported by the litter support assemblies, may or may not include a patient resting on one or more of the litters. The litter support assembly may also support and/or hold medical equipment. In developing improved litter support assemblies for the vehicles, it has been discovered that when the vehicles are exposed to or experience the illustrative shock loads set forth above, a significant portion of the load or force generated by these shock loads can be translated through the vehicles to equipment mounted to the vehicle (e.g., litter support assemblies, medical equipment, etc.) and thus potentially translated/transferred to the patient and/or sensitive equipment (e.g., medical equipment). Such transference of forces and/or loads has a potential to cause injury to the patient and/or damage to the medical equipment. Accordingly, the present disclosure describes and shows litter and/or medical support systems that can minimize or withstand the effects of turbulence, impacts, or other shock loads. That is, systems that can reduce the energy (e.g., forces, loads) being transferred to the patient and/or equipment.

In one or more illustrative examples shown and described herein, the litter support assembly may comprise a support arm assembly that may include a mounting bracket, a support arm attached to and extending from the mounting bracket, a first hook disposed at one end of the support arm, a second hook disposed at an end of the support arm opposite the first hook, and a shock absorbing device connected between the support arm and the mounting bracket. The mounting bracket may include any design, shape, or configuration and may be fabricated from a variety of materials, including but not limited to metals, plastics, alloys, composites, and any combinations thereof. As set forth above, the mounting bracket may be fabricated to be permanently attached to the wall of the medical care unit. Alternatively, the support arm may be attached directly to the wall of the medical care unit without the mounting bracket. In yet another alternative embodiment, the mounting bracket may be adapted to removably attach to the wall of the medical care unit, as shown and described in a few illustrative examples below herein.

The support arm may include a variety of designs, shapes, and/or configurations and may be fabricated from a variety of materials, including but not limited to metals, plastics, alloys, composites, and any combinations thereof. The support arm may be fixedly or pivotally connected to the mounting bracket using any conventional or yet-to-be developed mechanisms. The support arm extends outwardly from the mounting bracket in a cantilevered fashion.

The shock absorbing device is adapted to absorb, disperse, and/or dampen the forces and/or shock loads imparted through the vehicle to the mounting bracket and ultimately to the litter support assembly. The shock absorbing device may be integral to the support arm, integral the mounting bracket, a separate component connected between the mounting bracket and the support arm, or some combination thereof. Examples of shock absorbing devices include, but are not limited to, shock absorbers, pistons, resilient members, shock absorbing material(s), crushable elements, combinations thereof, or any other convention or yet-to-be developed shock absorbing mechanisms or means.

Referring to FIG. 1, an illustrative litter support assembly 10 is shown connected and/or mounted within a medical care unit 1. In one example, medical care unit 1 is a vehicle. The vehicle may include a wall 2 having a surface 3 interior to the vehicle and a floor 19. It is understood that the medical care unit 1 may include other walls, a ceiling, one or more doors and/or windows, and other conventional parts and components found in such medical care units. In one illustrative embodiment, the litter support assembly 10 is connected and/or mounted to a military ground vehicle such as, for example, an armored military ground vehicle. For example, medical care unit 1 shown in FIG. 1 may be an armored truck suitable for transporting military personnel, wherein the armored truck includes wall 2 having interior surface 3.

In another illustrative example, rather than a vehicle, medical care unit 1 may comprise a portable container such that litter support assembly 10 may be connected and/or mounted to an interior surface 3 of a side wall 2 of such container, and then such container is transportable on or by a vehicle such as, for example, on a back of a truck or other road vehicle, on a trailer, within an aircraft, ship, boat, or any other vehicle, to a location, removed from the vehicle, and left at such location on a temporary or permanent basis to be used to provide medical care to patients such as injured military personnel. The container may comprise a bottom wall (i.e., a floor), multiple side walls (e.g., four side walls such as side wall 2), a top wall, and one or more doors for accessing the interior space of the container. Exemplary containers may comprise conventional metal storage and shipping containers used for shipping and storing of goods as known to one of ordinary skill in the art. The medical care unit 1 may comprise such a container as set forth above, wherein the container has been modified to function as a mobile and/or portable hospital or medical care unit that comprises any and/or all desired medical care equipment and supplies such that patients may be treated and/or housed within the medical care unit 1 (i.e. within the container). In one illustrative embodiment, the medical care unit's walls may be fortified with armored plating to provide added protection from gunfire, other weapons, and/or explosions.

Figure 2:
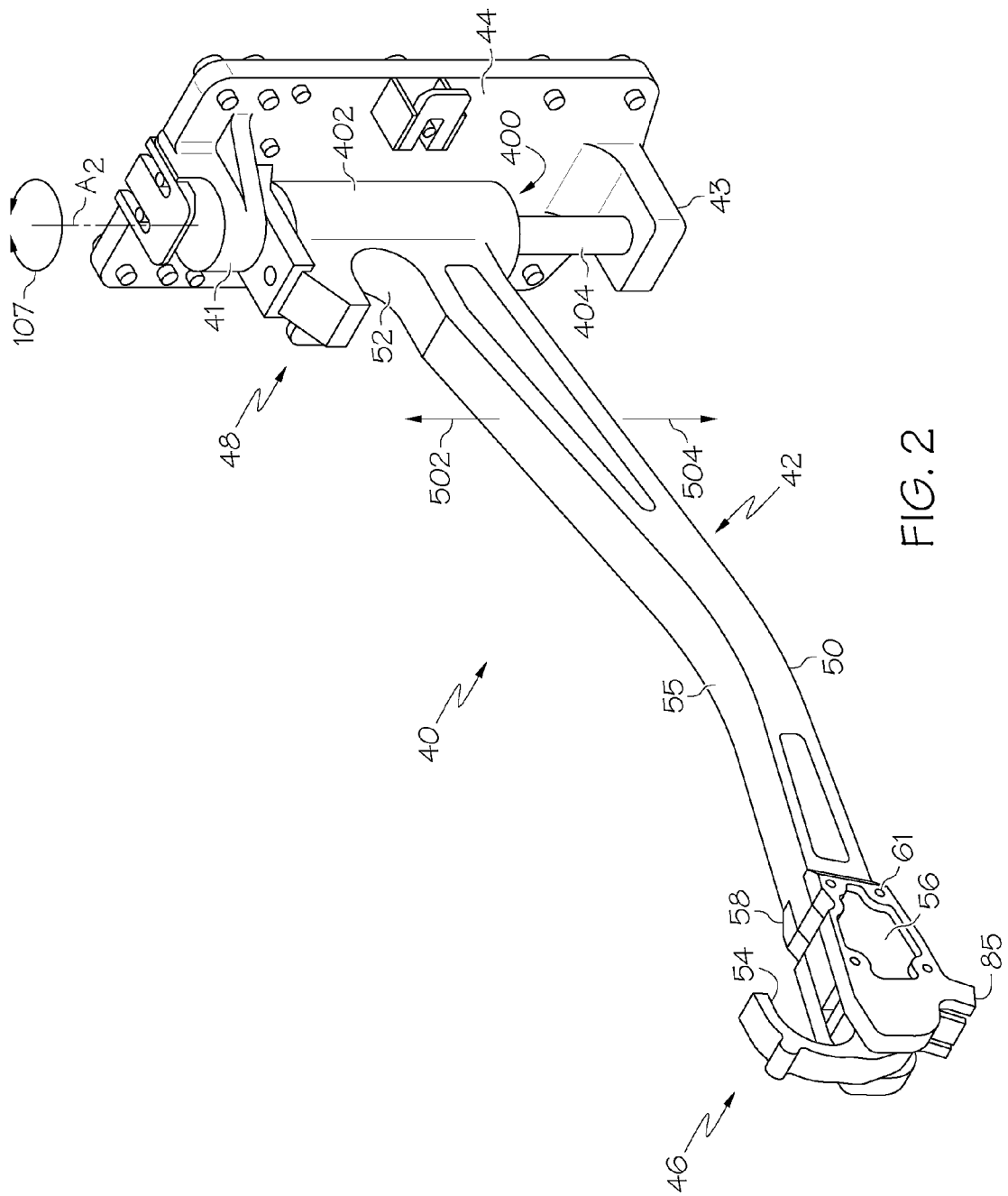
FIG. 2 is a perspective view of an illustrative shock absorber litter support assembly.

As will be shown and described below herein, the litter support assembly 10 may provide a modular, adjustable litter support assembly, capable of planned or unplanned adjustments to accommodate a variety of emergency circumstances, whether foreseen or unforeseen. The litter support assembly 10 may provide a number of configurations for supporting one or more litters carrying patients or other persons within vehicles and for stowing (see FIG. 2 illustrating an exemplary stowed configuration) or even removing components of the support system when not in use. The adjustability of the litter support assembly 10 may allow for accommodation of litters of various sizes (e.g., widths and thicknesses). The litter support assembly 10 may be modular in that a number of components of the litter support assembly may be interchangeable, which can reduce assembly time, complexity, and costs. Such modularity in the litter support assembly 10 may allow for a more rapid and fluid response to a particular emergency situation, which may improve medical outcomes in some instances. The litter support assembly configuration allows its use in a variety of different vehicles and/or other medical units, thus providing the benefit of interchangeability and flexibility. Additionally, the support assembly 10 and/or the support arm assembly (e.g., 22, 24, 26, 28) may provide shock load absorbing capabilities, thus preventing injury to patients and/or damage to equipment within the medical care unit 1.

Still referring to FIG. 1, the litter support assembly 10 may generally include a first support arm assembly (e.g., first upper support arm assembly 22) and a second support arm assembly (e.g., a second upper support arm assembly 24). In still other examples, the litter support assembly may also include a wall mount (e.g., track system 20) adapted to received and/or connect to the first and second upper support arm assemblies 22 and 24. As shown in FIG. 1, the litter support assembly 10 includes an upper litter support assembly 12 that includes first and second upper support arm assemblies 22 and 24 and a lower litter support assembly 16 that includes a first and second lower support arm assembly 26 and 28, respectively. All the support arm assemblies 22, 24, 26, 28 include a mounting bracket 44 that connects (e.g., removably connects) to a corresponding wall bracket (e.g., a first track 30 of track system 20 and a second track 32 of track system 20) that is mounted to the wall 1.

As shown, the upper litter support assembly 12 supports and/or connects to an upper litter 14, and the lower litter support assembly 16 supports and/or connects to a lower litter 18 in their illustrated positions, spaced vertically from the floor 19 of the medical care unit 1. In the illustrated example, the upper litter support assembly 12 supports the upper litter 14 above and substantially parallel to the lower litter 18. The upper litter 14 and the lower litter 18 are also shown as being oriented substantially parallel to the floor 19 of the medical care unit 1. Other orientations are possible, however. For example, one or both of the upper and lower litters 14 and 18 may be supported by their associated upper and lower litter support assemblies 12 and 16 in an inclined orientation, i.e., at an angle to the floor 19 of the medical care unit 1 and/or at an angle to each other.

Each support arm assembly 22, 24, 26 and 28 may be separately adjustable along a height of the track system 20. In other embodiments, the upper support arm assemblies 22, 24 and/or the lower support arm assemblies 26, 28 may be linked such that their heights are adjustable together. As yet another example, the first upper and lower support arm assemblies 22, 26 and/or the second upper and lower support arm assemblies 24, 28 may be linked such that their heights are adjustable together. In many examples, each support arm assembly 22, 24, 26 and 28 is individually adjustable.

The track system 20 includes a first track 30 and a second track 32 horizontally spaced-apart from the first track. Each track 30 and 32 may be substantially parallel and oriented vertically as shown; however, other orientations are possible, such as off vertical orientations. In some embodiments, for example, the first and second tracks 30 and 32 may have a horizontal orientation. In other examples, the track system 20 may comprise a first track spanning an entire wall in both the horizontal and vertical directions such that a mounting bracket may be removably attached to the track at any location along the wall. In yet another example, the track may be mounted to the device that is to be secured to a wall while the wall comprises a plurality of projections for receiving the track. It should be appreciated that any other track location and configuration may further be realized. In one particular example, slots 34 are provided in the first and second tracks 30 and 32. The slots 34 run vertically along the lengths of the first and second tracks 30 and 32 and provide locking structures for fixing a vertical position of the support arm assemblies 22, 24, 26 and 28. As can be seen, each first and second track 30 and 32 includes multiple, horizontally spaced-apart slots 34. While four slots 34 are illustrated per track 30 and 32, there may be more or less than four slots, such as three slots. A three slot configuration will be described in detail below.

In some examples, printed or painted indicia 35 may be used along with the track system 20. For example, a height indicator may be placed alongside or even on the tracks 30 and 32. In some other examples, a marker may be placed along a height of the tracks 30 and 32 to allow for rapid adjustments of the support arm assemblies 22, 24, 26 and 28. The indicia may be located on the tracks 30 and 32 and/or on the wall 2.

It should be noted that while two litter support assemblies 12 and 16 are illustrated in FIG. 1, there may be more or less than two litter support arm assemblies per track system 20. Additionally, there may be more than one litter support assembly 10 in the vehicle. For example, multiple litter support assemblies 10 may be mounted at various locations within the medical care unit 1.

Various components other than the support arm assemblies 22, 24, 26 and 28 may be supported by the track system 20. In some embodiments, a monitor 36 (e.g., for monitoring vital signs) may be supported on the first track 30, while a different medical device 38, such as another monitor or other device such as an infusion pump apparatus, IV bag, lighting systems, etc., may be supported on the second track 32. Any number of medical related devices or non-medical devices may be supported on the track system 20. The various monitoring components, such as the monitor 36, may be wired or wireless (e.g., using Bluetooth technology). In some instances, it may be useful to locate the monitor 36 and device 38 closer to the litter support assembly 12 and 14 carrying the patient that is using the monitor 36 and the device 38. For example, in FIG. 1, the monitor 36 and device 38 are located above the upper litter support assembly 12 for use in monitoring a patient located on the upper litter support assembly. In another configuration, the monitor 36 and the device 38 may be located between the upper litter support assembly 12 and the lower litter support assembly 14 for use in monitoring a patient located on the lower litter support assembly. In other embodiments, such as where the track system 20 is disposed on the exterior of a vehicle, auxiliary support equipment may also be mounted to the track system 20. Although not shown, it is understood that such other components adapted to be mounted to the track system 20 may comprise one or more shock absorbing devices to absorb, disperse, and/or dampen the forces and/or shock loads imparted through the vehicle to the mounting bracket and ultimately to the litter support assembly.

Figure 3:
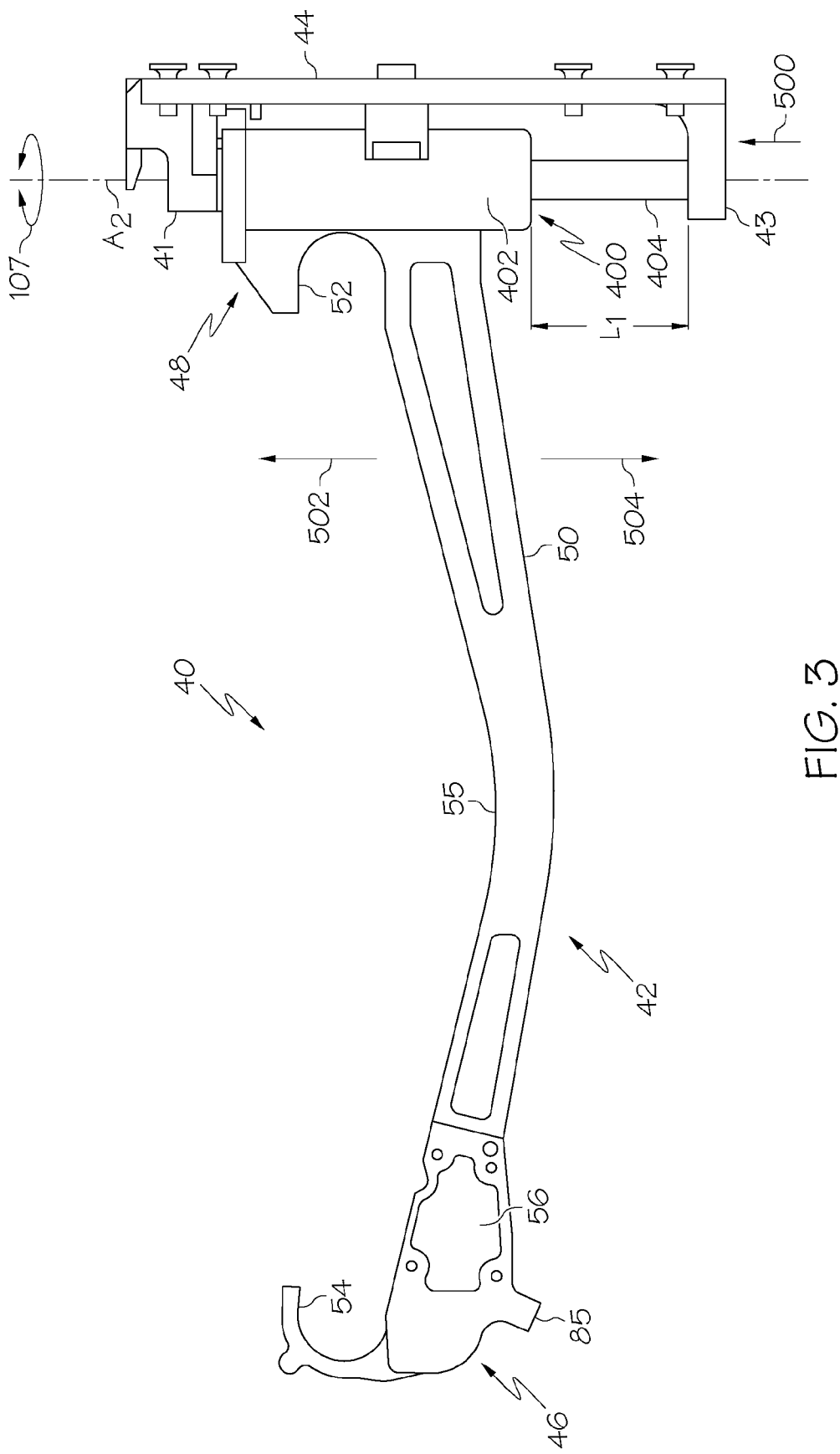
FIG. 3 is a side view of the illustrative shock absorber litter support assembly of FIG. 2.

Referring to FIGS. 2 and 3, an embodiment of a support arm assembly 40 for use as first and/or second support arm assemblies (e.g., 22, 24, 26, 28) in any one or both of the upper litter support assembly 12 and the lower litter arm support assembly 16 may generally include a support arm 42 and a mounting bracket 44. The support arm 42 has a terminal, free end 46, an attachment end 48 that is mounted to the mounting bracket 44 and an elongated arm portion 50 that extends between the free end 46 and the attachment end 48. It is understood that although as shown herein the attachment end 48 is removably connected to the mounting bracket 44, the mounting bracket 44 and the support arm 42 may be an integral piece or permanently connected such as, for example, welded, brazed, etc., at the attachment end 48. It is also understood that the mounting bracket 44 may simply include the attachment end 48 itself. The mounting bracket 44 may be permanently connected to the wall of the vehicle using welding, brazing, etc. Alternatively, the mounting bracket 44 may be removably connected using conventional connecting devices such as, for example, screws, bolt/nut combinations, brackets (e.g., mounting brackets and track systems as shown and described below herein), any other conventional methods, or combinations thereof.

The support arm assembly 40 may also include a first litter side shaft engagement mechanism (e.g., a first hook 52) that may be located at or near the attachment end 48. The first litter side shaft engagement mechanism may be any number of designs, configurations, and devices such as, for example, static hooks (such as the one shown in the figures), dynamic hooks or ratchet hooks (e.g., second hook 54), flexible straps (e.g., cloth, nylon, etc.), and/or any other conventional means to connect a litter to a litter support arm as known to one of ordinary skill in the art. In the illustrative embodiment shown in FIGS. 2-3, the first hook 52 may be fixed relative to the arm portion 50 and be sized and located to receive a side shaft of a litter. Also, the support arm assembly 40 may include a second litter side shaft engagement mechanism (e.g., a second hook 54) that may be located at the free end 46. The second litter side shaft engagement mechanism may be any number of designs, configurations, and devices such as, for example, static hooks (e.g., first hook 52), dynamic hooks or ratchet hooks (e.g., second hook 54), flexible straps (e.g., cloth, nylon, etc.), and/or any other conventional means to connect a litter to a litter support arm as known to one of ordinary skill in the art. The second hook 54 may be sized and located to receive an opposite side shaft of the litter.

In some embodiments, the elongated arm portion 50, the first hook 52 and the attachment end 48 of the support arm assembly 40 may be formed together as a single piece, such as by casting a metal material (e.g., aluminum, steel, etc.). As can be seen, the arm portion 50 may have a bend 55 toward a center of the arm portion. The bend 55 may be shaped to reduce any interference between the arm portion 50 and spreader bars of the litter (i.e., curved bars running between and transverse to the side rails of the litter). The free end 46 may include an assembly of plates 56 and 58 that sandwich and connect the free end 46 to the elongated arm portion 50. Any suitable connecting structure or method may be used to connect the plates 56 and 58 together, such as by fasteners 61, welding, etc.

The support arm assembly 40 further includes a shock absorbing device 400 (e.g., shock load absorbing) connected between the mounting bracket 44 and the support arm 42. As shown, the shock absorbing device 400 is disposed at and integral to the attachment end 48 of the support arm 42 and positioned between and connected to a first bracket flange 41 and a second bracket flange 43. The support arm 42 may pivot in a direction 107 about axis $A_2$.

The shock absorbing device 400 may comprise shock dampening mechanisms of conventional shock absorbers, struts, load dampeners, load breaks, or other similar shock load absorbing devices. As shown, the shock absorbing device 400 is positioned parallel or at least substantially parallel to the track system 20 and/or the wall 2. However, it is understood that the shock absorbing device 400 may comprise any design, shape, and configuration and be disposed in a variety of angular orientations such as, for example, vertical, horizontal, or any angular orientation therebetween. In designing or choosing the shock absorbing device 400, one of ordinary skill in the art would determine what is the maximum shock load that the vehicle (and thus the litter(s)) would be exposed to and/or what is the maximum shock load that is desired for the shock absorbing device 400 to completely or partially absorb, disperse, dampen, or dissipate and not transfer or, at least, not completely transfer, to the litter and the patient thereon. The shock load can be determined in a variety of conventional methods such as, for example, as a force or gravitational acceleration. The shock absorbing device 400 may be adapted to have the capacity to resist shock loads having a maximum force from about 0.5 times gravitational acceleration to about 10 times gravitational acceleration, from about 1 times gravitational acceleration to about 8 times gravitational acceleration, from about 2 times gravitational acceleration to about 6 times gravitational acceleration, from about 3 times gravitational acceleration to about 5 times gravitational acceleration. However, it is understood that the shock absorbing device 400 may be adapted to have the capacity to resist a variety of different levels of maximum force.

In the illustrative example shown in FIGS. 2 and 3, the shock absorbing device 400 may comprise active, semi-active, and/or passive shock absorbers that may include, but are not limited to pneumatic shock absorbers, hydraulic shock absorbers, absorbent material shock absorbers or dampers, electrorheological fluid dampers, magneto rheological dampers, Eddy current dampers, composite hydropneumatic devices, combinations thereof, or any other conventional shock absorbing devices.

In one illustrative example, the shock absorbing device 400 comprises a pneumatic or hydraulic shock absorber which includes a cylinder having a sliding piston disposed therein. The cylinder is filled with a liquid such as, for example, a hydraulic fluid, oil, or air. One example of a fluid that may be used in the shock absorbing device 400 is shown and described in U.S. Patent Publication No. 2010/0137176, which is herein incorporated by reference in its entirety. This fluid-filled piston/cylinder combination may comprise a dashpot. The shock absorber of this example may also include cushions and/or springs. Such shock absorbers are well known in the art and commercially available. As shown, the shock absorber 400 includes an outer cylinder 402 at least partially encompassing an inner cylinder or rod 404 such that the inner cylinder/rod 404 may travel into or out of the outer cylinder 402, e.g., in a piston-like manner. The inner cylinder or rod 404 may be part of a piston (not shown) that travels within the outer cylinder 402. The outer cylinder 402 may also comprise an orifice that as the inner cylinder or rod 404 moves the piston inward toward the outer cylinder 402, the piston forces the fluid within the outer cylinder 402 through this orifice, thus, providing the dampening effect.

The shock absorbing device 400 may be passive in that the device 400 is tuned to certain frequencies and not actively adjustable (e.g., not using a feedback loop). For example, the orifice (not shown) or the shock absorbing device 400 may be sized or tuned to support the support arm 42, the litter (e.g., litter 14), and a patient thereon, but upon experiencing a acceleration above a threshold acceleration due to a shock load, the fluid is forced through the orifice absorbing and/or dampening the shock load upon the support arm 42 and thus the patient. The orifice may be tuned to a certain frequency or frequency range, but is not actively adjustable based upon a feedback loop.

An advantage of the pneumatic shock absorber is that using special conventional, internal valving the absorber may be made relatively soft to compression (allowing a soft response to a shock load) and relatively stiff to extension, controlling "rebound", which is the litter response to energy stored in the springs (if springs are used in combination with the pneumatic shock absorber); similarly, a series of valves controlled by springs can change the degree of stiffness according to the velocity of the load, impact or rebound. Some illustrative shock absorbers allow tuning of the shock absorber via control of a valve by a manual adjustment provided at the shock absorber. In alternative shock absorbers, the valves may be remotely adjustable, offering dampening control at will. Additional control of the dampening of a shock may be provided by dynamic valve control via computer in response to sensors. In certain other examples, the shock absorbing device 400 may include a reservoir containing metal fillings within the device 400 and one or more magnets surrounding the metal filling-filled reservoir to produce a tunable shock absorber.

In some illustrative shock absorbers, the shock absorbers are pressurized with compressed nitrogen, to reduce the tendency for the oil to cavitate under heavy use. This causes foaming which temporarily reduces the damping ability of the unit. In certain other embodiments, there may even be a secondary cylinder connected to the first shock absorber to act as a reservoir for the oil and/or pressurized gas.

When the support arm 42 travels in direction 504, the inner cylinder/rod 404 slides into the outer cylinder 402. As shown in FIG. 3, the support arm 42 has a maximum linear travel of $L_1$ between the first bracket flange 41 and the second bracket flange 43. It is understood that the linear travel $L_1$ may be adjusted to a variety of lengths depending upon the desired linear travel, maximum design load or acceleration, vertical space within the vehicle, and other variables.

In other examples, the outer cylinder 402 may include some type of dampening material therein to supplement or in replace of the hydraulic fluid or gas to dampen the shock loads transferred from the mounting bracket 44 to the support arm 42. Examples of dampening materials may include, but are not limited to fluids (e.g., oils, water, hydraulic fluids, viscous fluids, air, gases, oleo (air and oil), etc.), foams, springs, resilient materials, shock absorbing materials, metal filling in conjunction with magnets, magnets, electro-magnets, or any other conventional materials capable of dampening the shock loads found in conventional shock absorbers, load dampers, load breaks, passive or active dampening systems (e.g., similar to passive or active suspension systems in vehicles), etc. The dampening material within the shock absorbing device 400 may absorb the energy (e.g., shock load) transferred from the vehicle 1 to the mounting bracket 44. In other examples, the shock absorbing device 400 may comprise a conventional shock absorber combined with composite pneumatic springs to permit litter support height adjustment or dampening height and/or travel control.

Examples of shock absorbing devices and/or systems that may be used or modified for use as the shock absorbing device 400 in one or more of the embodiments disclosed herein are shown and described in one or more of the following Patent Publication Nos. or U.S. Pat. Nos. 3,656,633; 3,666,256; 3,724,832; 3,771,778; 3,794,309; 3,876,044; 3,882,977; 3,888,531; 4,200,268; 4,275,802; 4,353,431; 4,396,096; 4,674,607; 4,693,317; 4,817,710; 4,971,751; 4,995,659; 5,133,419; 5,134,566; 5,369,579; 6,102,417; 6,318,525; 6,412,614; 6,871,731; 7,321,816; 7,342,743; 7,779,907; 7,959,135; 2002/0084658; 2003/0141157; 2004/0140090; 2005/0240326; 2009/0079155; 2009/0133977, which are all herein incorporated by reference in their entirety. Examples of shock absorbing materials or shock absorbing devices using shock absorbing material that may be used or modified for use as the shock absorbing device 400 in one or more of the embodiments disclosed herein are shown and described in one or more of the following Patent Publication Nos. or U.S. Pat. Nos. 5,551,673; 2002/0063369; 2008/0116720; 2010/0000399, which are all herein incorporated by reference in their entirety Alternatively, as set forth above, the shock absorbing device 400 may be or be a part of an active or semi-active shock absorber or suspension system such that the device 400 is actively adjustable based upon the level of the shock load experienced by the device 400. For example, when using a fluid in the shock absorbing device 400, the device 400 may include an orifice (not shown), wherein the orifice's size is adjustable and the device 400 utilizes a feedback loop to adjust the orifice's size based upon the level of shock load experienced by the device 400. The absorbing devices 400 may include an active shock absorber or suspension system. Such active shock absorber or suspension system are conventionally known (e.g., as found in active suspensions for automobiles) and may include accelerometers, integrated circuits programmed with algorithm(s), instructing the shock absorbing device 400 how to adjust itself based upon the received shock load. The active shock absorbing device 400 may—, e.g., similar to or the same as active suspension systems found in automobiles. A few illustrative active suspension systems that may be used and/or slightly modified to be used as the shock absorbing device 40 are shown and described in one or more of the following Patent Publication Nos. and/or U.S. Pat. Nos. 4,589,675; 4,962,946; 4,982,979; 4,999,777; 5,015, 009; 5,033,770; 5,037,128; 5,048,861; 5,054,808; 5,071,159;

5,074,569; 5,085,459; 5,087,072; 5,098,119; 5,103,397; 5,110,152; 5,137,299; 5,160,160; 5,160,161; 5,162,995; 5,174,598; 5,231,583; 5,232,242; 5,299,488; 5,308,938; 5,322,321; 5,342,023; 5,439,075; 5,489,115; 5,522,221; 5,572,425; 5,660,411; 5,678,847; 5,682,980; 5,743,553; 5,899,288; 5,947,458; 6,000,703; 6,059,253; 6,249,728; 6,259,982; 6,352,142; 6,467,748; 6,507,778; 7,321,816; 7,627,408; 2002/0133277; 2005/024326; 2007/0113070; 2008/0275606; 2009/0248246; and 2010/0152969, all of which are herein incorporated by reference in their entirety.

As such, when the vehicle 1 is exposed to a shock load such as, for example, an upward shock load, the shock absorbing device 400, instead of transferring this upward shock load to the support arm 42 and moving the support arm 42 in the upward direction as indicated by arrow 502, the shock absorbing device 400 absorbs this shock load by slowing or dampening the travel of inner rod 404 into outer cylinder 402 along the direction of 502, minimizing the load and movement experienced by a patient on supported by the litter support system.

Figure 4:
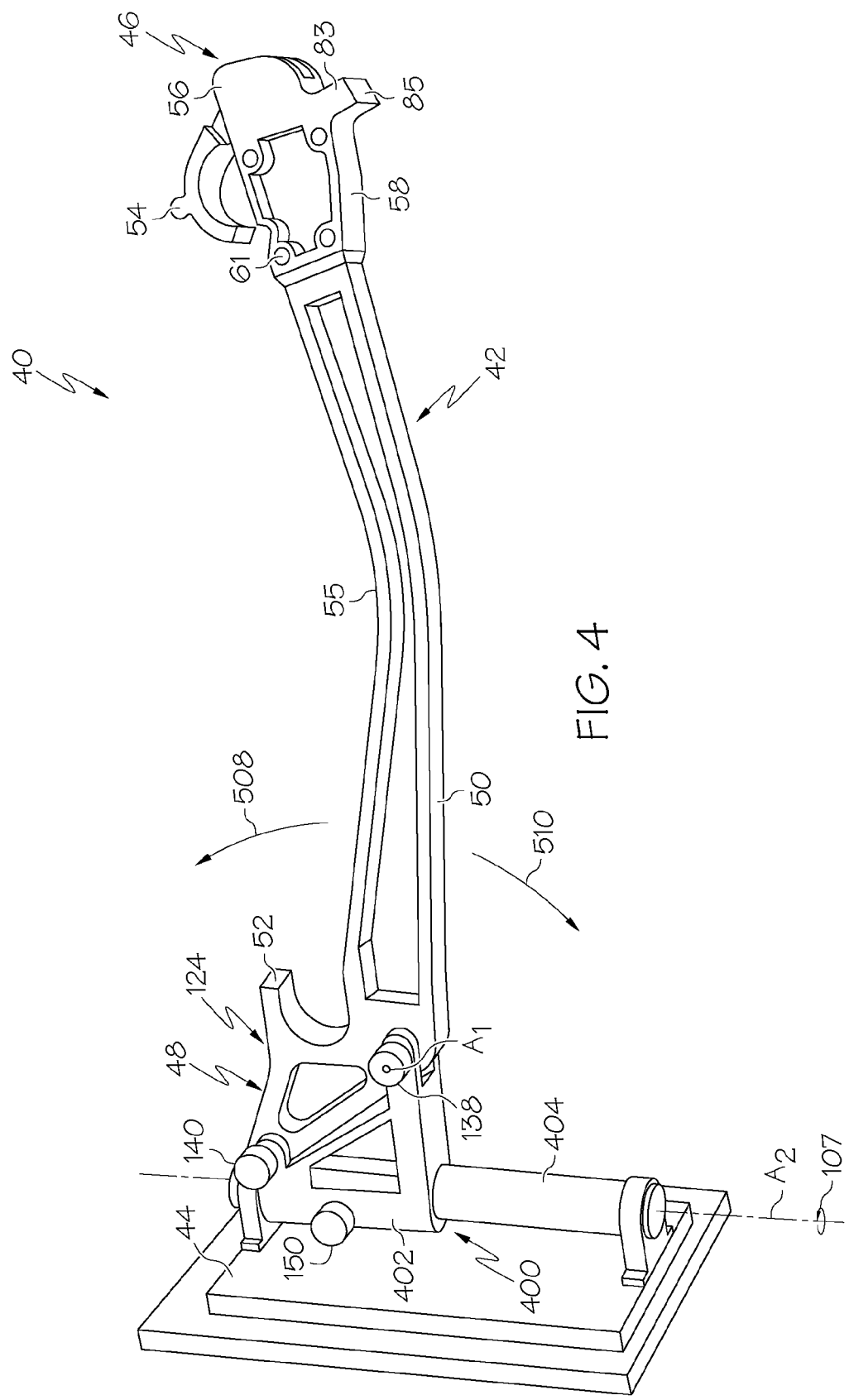
FIG. 4 is a perspective view of another illustrative shock absorber litter support assembly.

Referring to FIG. 4, another example of the support arm assembly 40 is shown. As shown, the support arm assembly 40 is shown to include the same or similar components, functionality, and capabilities as the illustrative example shown in FIGS. 2 and 3 and described above herein. In addition, the support arm assembly includes a hinge 505 that enables the support arm 42 to pivot about axis $A_1$ in the upward, arcuate direction 508 and the downward, arcuate direction 510. When the support arm 42 moves in direction 508 to its maximum travel, the support arm 42 is in its stow position. The support arm assembly 40 includes a release pin 507 that when released permits the support arm 42 to pivot in directions 508 and 510 as set forth above. When release pin 507 is in the unreleased position, it holds the support arm 42 in its outwardly, cantilevered position as shown in FIG. 4.

Figure 5:
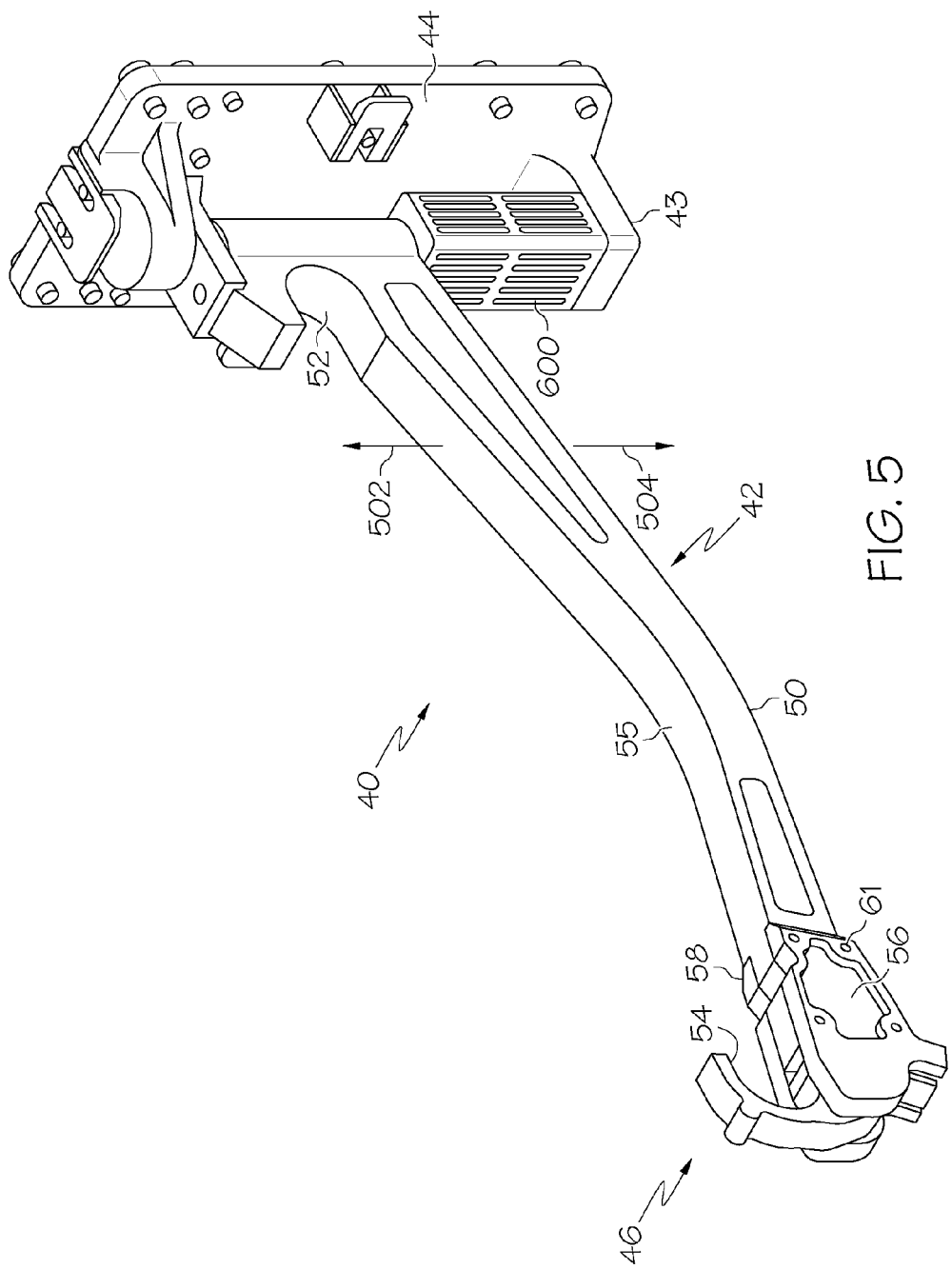
FIG. 5 is a perspective view of another illustrative shock absorber litter support assembly.
Figure 6:
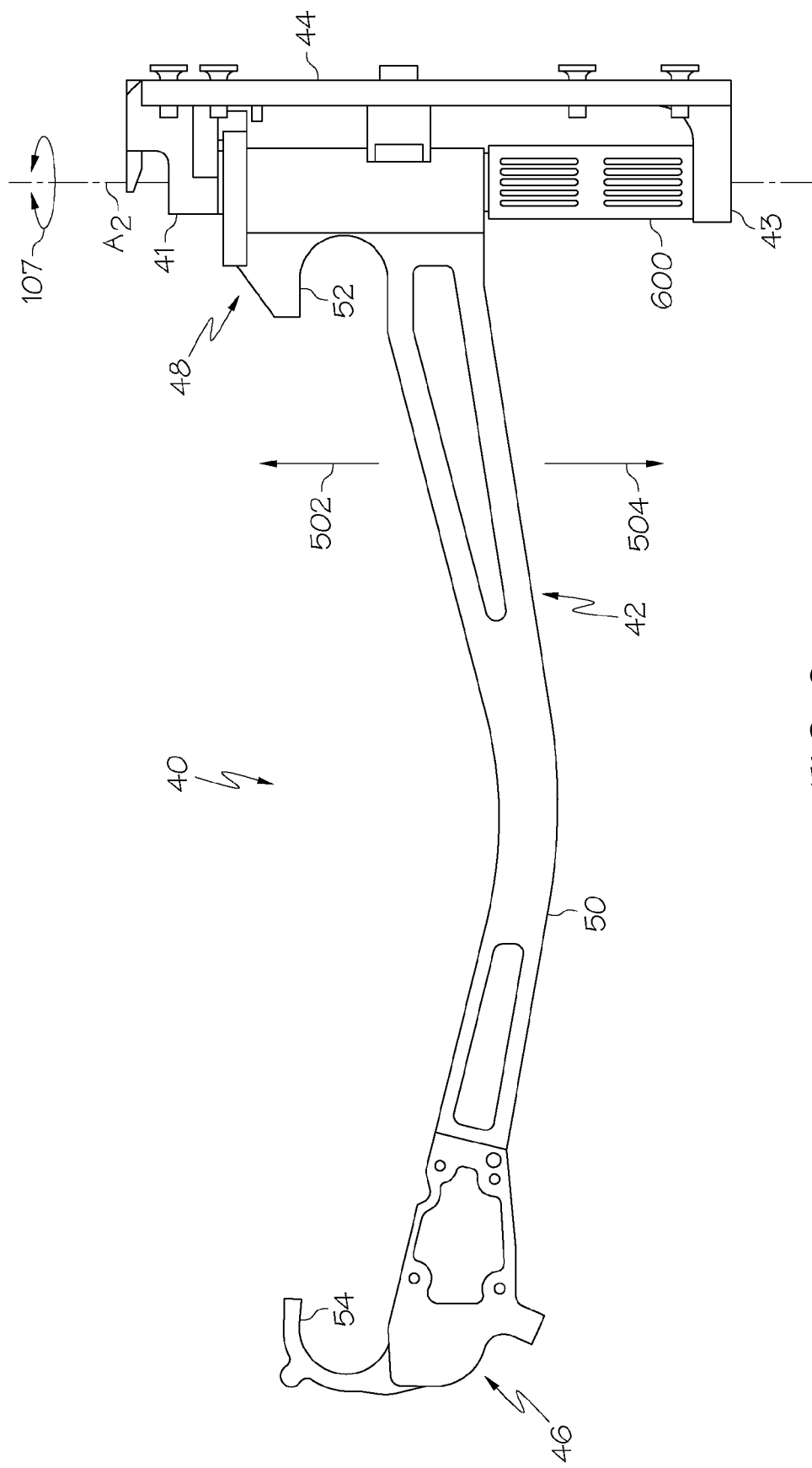
FIG. 6 is a side view of the illustrative shock absorber litter support assembly of FIG. 5.

In other examples, the shock absorbing device may comprise a crushable member. In such an example, the load arm assembly may include different, similar, or the same components as shown in FIG. 2, 3, or 4 and described above herein. Referring to FIGS. 5 and 6, the support arm assembly 40 is shown to include the same or similar components, functionality, and capabilities as the illustrative example shown in FIGS. 2 and 3 and described above herein, except that shock absorbing device 400 has been replaced by a shock absorbing device 600.

Shock absorbing device may comprise an outer cylinder 602, an inner cylinder or rod 604 that is partially encompassed by the outer cylinder 602, and a collapsible or crushable element 606. Collapsible element 606 is fabricated from a material that is adapted to be collapsible or crushable when exposed to accelerations or forces above a designed threshold acceleration or force, respectively. The material could be scored or weakened in some other manner to force the collapsible element 606 to collapse (or crush) in a desired way and when exposed to an acceleration or load that exceeds a set threshold acceleration or load. The collapsible element 606 may be fabricated from metals, plastics, composites, alloys, or any combinations thereof.

In certain examples, the shock collapsible element 606 may comprise, but not be limited to, any thermoplastic polyester elastomer with a tensile modulus of elasticity from about 15,000 psi to about 65,000 psi, more particularly from about 20,000 psi to about 50,000 psi, even more particularly about 25,000 psi. One illustrative thermoplastic polyester elastomer is a material known as Dupont® brand Hytrel® as disclosed in U.S. Pat. No. 4,264,761, U.S. Pat. Nos. 3,954, 689, and 3,775,373, all being incorporated herein by reference. This illustrative material has the desired structural dynamic properties, is impervious to most solvents and other agents, has an expected life in severe environments from about 10 years to about 30 years, and has a high creep resistance. It is understood that other materials that provide one or more of the properties set forth above may be used for the shock absorbing device 600.

In operation, when the vehicle 1 is exposed to a shock load such as, for example, an upward shock load, the shock absorbing device 600, instead of transferring this upward shock load to the support arm 42 and moving the support arm 42 in the upward direction as indicated by arrow 502, the shock absorbing device 600 absorbs this shock load by collapsing or crushing the collapsible element 606, dissipating the acceleration or load and thus the acceleration or load experienced by a patient supported by the litter support system.

Figure 7:
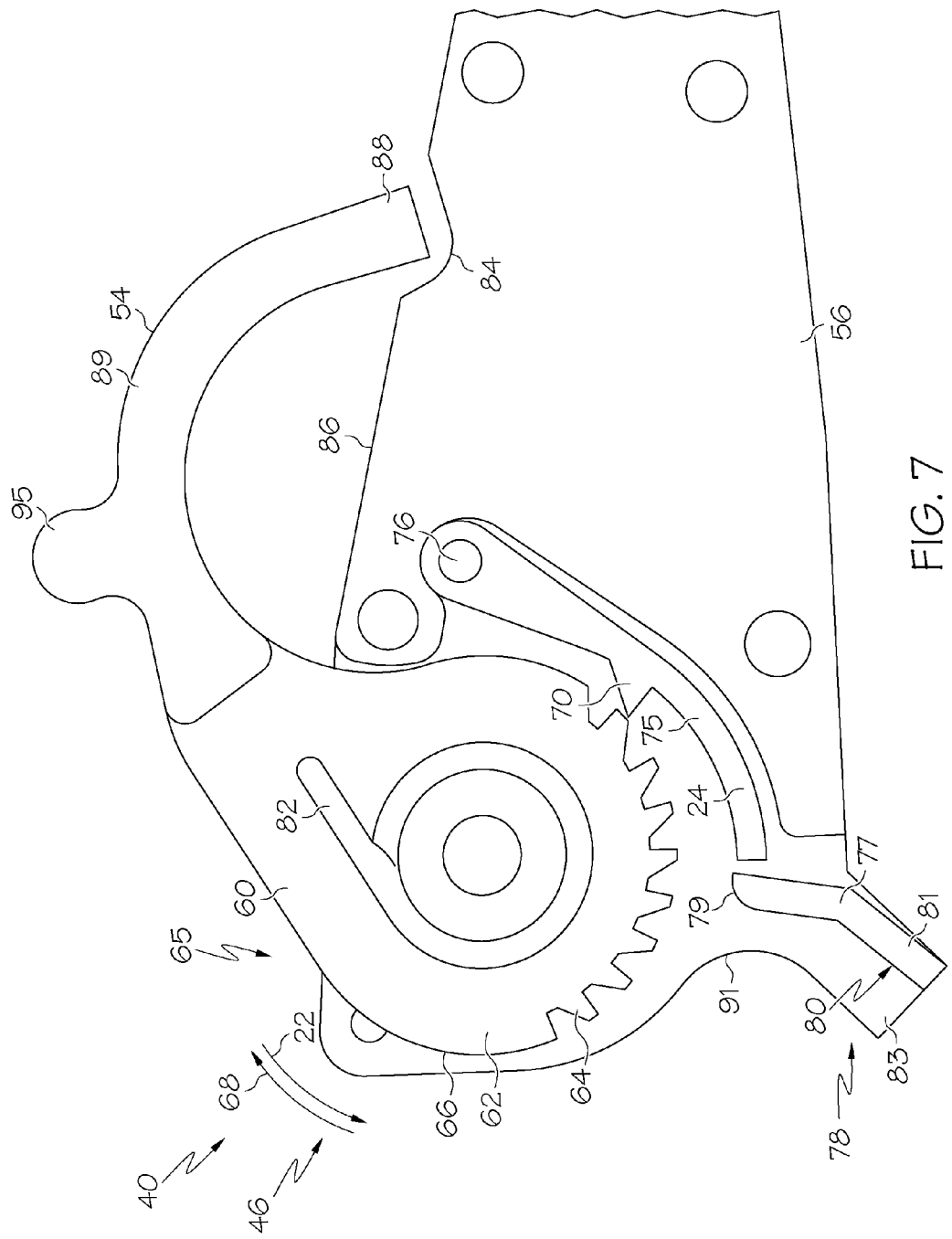
FIG. 7 is a side elevational cut-away detail view of the illustrative ratchet assembly of the shock absorber litter support assembly shown in FIG. 2.

Referring now to FIG. 7 showing the free end 46 of the support arm assembly 40 with plate 58 removed, the second hook 54 may be part of an adjustable hook assembly 65 that is at least partially housed between the plates 56 and 58. The adjustable hook assembly 65 includes the second hook 54, which may be attached to a ratchet 60 including a gearwheel 62 with teeth 64 located about a periphery 66 of the ratchet. In the illustrated example, the teeth 64 may be slanted at an angle so that when the teeth are moving in the direction of arrow 68 (i.e., the closing direction), a pawl 70 slides up and over each tooth in turn. When the teeth 64 are moving in the direction of arrow 72 (i.e., the opening direction), the angles of the pawl 70 and the teeth 64 cause the pawl to catch against a tooth 64 and stop further motion in that direction.

The pawl 70 may be biased toward the gearwheel 62 (e.g., by a spring) and is located on a trigger 74, which is pivotally connected to the free end 46 at pivot 76. The trigger 74 has a curved portion 75 with the pawl 70, a downward portion 77 connected to the curved portion by a bend 79 and a slanted portion 81 at an angle to the downward portion. An access location 78 may be provided at the free end 46 between guard members 83 and 85 that may be part of the plates 56 and 58 to allow an operator to move (e.g., depress) the trigger 74 and the pawl 70 in the direction of arrow 80 out of engagement with the gearwheel 62. The ratchet 60 may be biased toward the open position (e.g., using a spring 82). When the trigger 74 and associated pawl 70 are moved out of engagement with the gearwheel 62, the ratchet 60 and associated second hook 54 may move in the opening direction of arrow 72 due to the bias provided by the spring 82.

The ratchet 60 and the second hook 54 are pivotable between the closed position and the open position and can be locked at multiple positions between the closed position and the open position due to the interaction between the gearwheel 62 and the pawl 70. A notch 84 extends inwardly from an upper surface 86 of the free end 46 that is sized to receive an end 88 of the second hook 54 with the second hook in the closed position. The notch 84 allows the end 88 of the second hook 54 to be located beneath the upper surface 86 and sheathed within the notch, which can reduce the possibility of snagging the second hook 54 unintentionally due to an exposed hook end 88.

Figure 8:
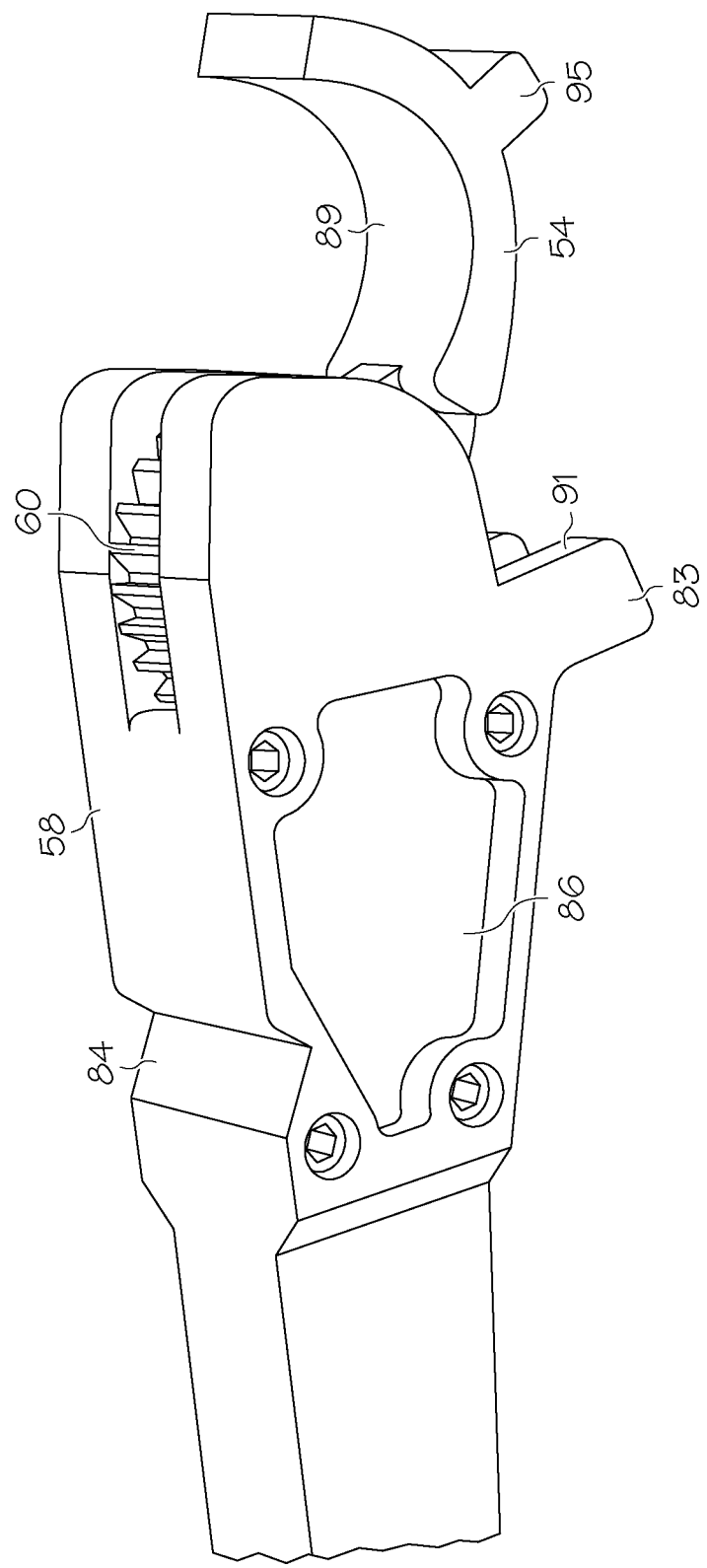
FIG. 8 is a perspective detail view of the illustrative ratchet assembly of the shock absorber litter support assembly shown in FIG. 2.

Referring also to FIG. 8, a view of the second hook 54 is shown in the open position. In one example, the periphery 66 of the ratchet 60 may come into contact with the bend 79 of the trigger 74, which serves as a stop surface for stopping rotation of the second hook 54 in the open position shown. As another example, the second hook 54 may have an increased thickness at crook portion 89 that is greater than an interior distance between the plates 56 and 58. Surfaces (only surface 91 can be seen) of the guard members 83 and 85 may serve as stop surfaces to prevent rotation of the second hook 54 once in the closed position. Other suitable stop arrangements may also be employed to stop rotation of the second hook beyond a desired open position. In some examples, a projection 95 may be provided on the crook portion 89 of the second hook 54. The projection 95 may provide a location for controlling movement of the second hook 54, e.g., using a thumb.

With the ratchet 60 and pawl 70, the adjustable hook assembly 65 may be operated with only one hand, which may free the other hand to engage in other tasks. By separating the pawl 70 from the gearwheel 62, the biased ratchet 60 can open without any force in addition to that provided by the spring 82 as long as the pawl remains separated from the gearwheel 62. Once the ratchet 60 and second hook 54 are in the open position, the ratchet and the second hook can be rotated toward the closed position with the same trigger-operating hand. The teeth 64 and the pawl 70 are slanted at an angle so that when the teeth are moving in the closed direction, the pawl slides up and over each tooth in turn and the spring associated with the pawl forces the pawl back into an adjacent depression before the next tooth until the second hook 54 grasps the shaft of the litter or reaches the closed position. Once the second hook 54 grasps the shaft of the litter, the ratchet 60 and pawl 70 prevents opening of the second hook due to the locking arrangement between the ratchet and the pawl. In embodiments where the second hook 54 is adjustable between open and closed positions, the litter support assembly 16 may be operable to at least partially enclose, and thus secure, side shafts 18', 18" of various litters 18 where the various litters 18 have different widths W and/or the side shafts 18', 18" of the various litters have different diameters D. For example, where two litters 18 have slightly different widths W (i.e., the distance between the side shafts 18', 18"), or comprise side shafts 18', 18" with slightly different diameters D, such as a result of different manufacturing origins, the same support arm assemblies 26, 28 may be operable to support either litter due to the adjustable second hook 54 being operable to adjustably secure side shafts of different configurations and in different positions.

Figure 9:
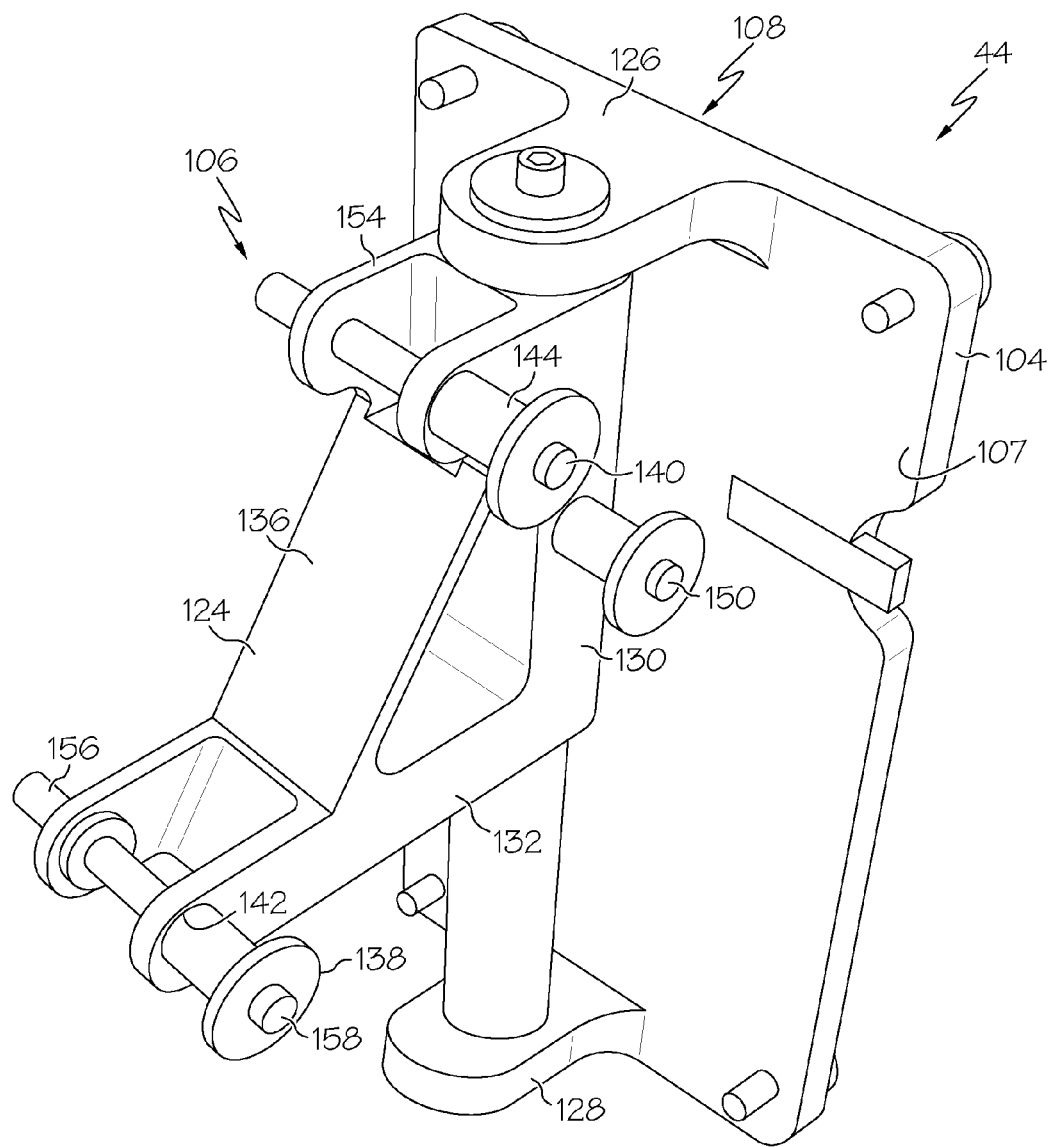
FIG. 9 is a perspective view of an illustrative mounting bracket for use with the shock absorber litter support arm assembly of FIG. 4.
Figure 10:
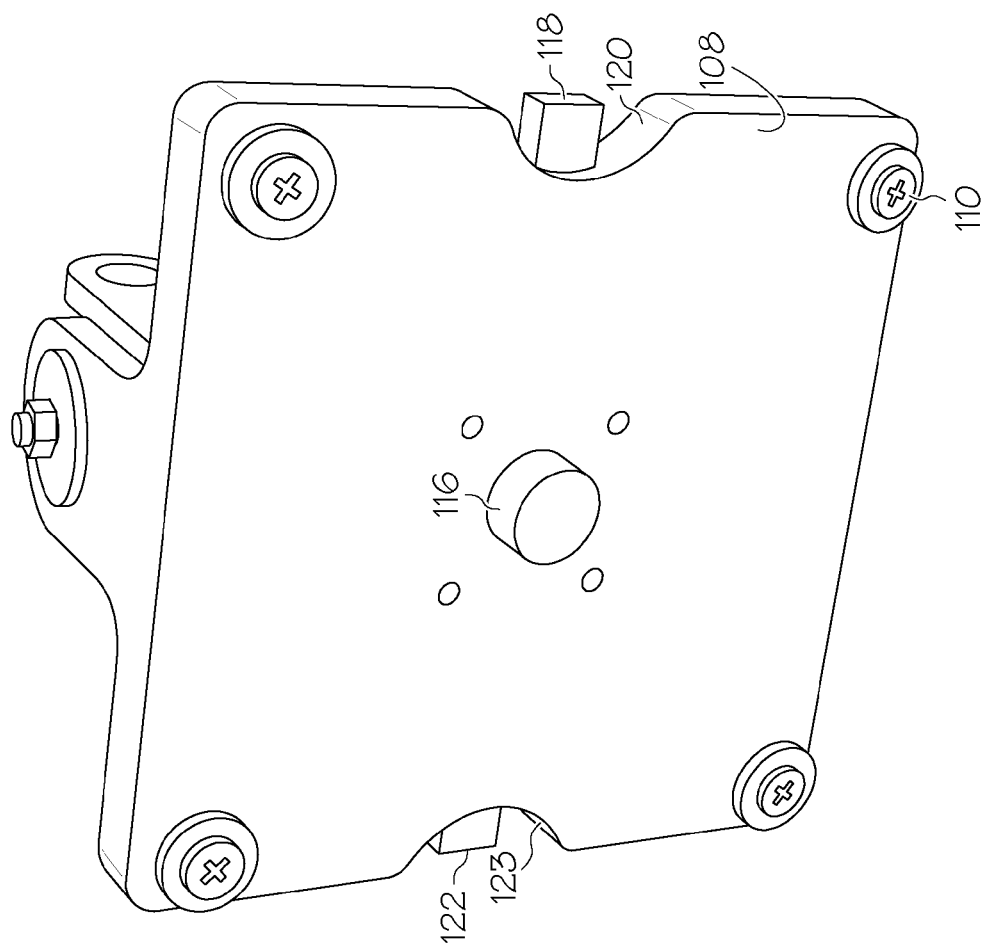
FIGS. 10 and 11 are bottom views of the exemplary mounting bracket of FIG. 9.
Figure 11:
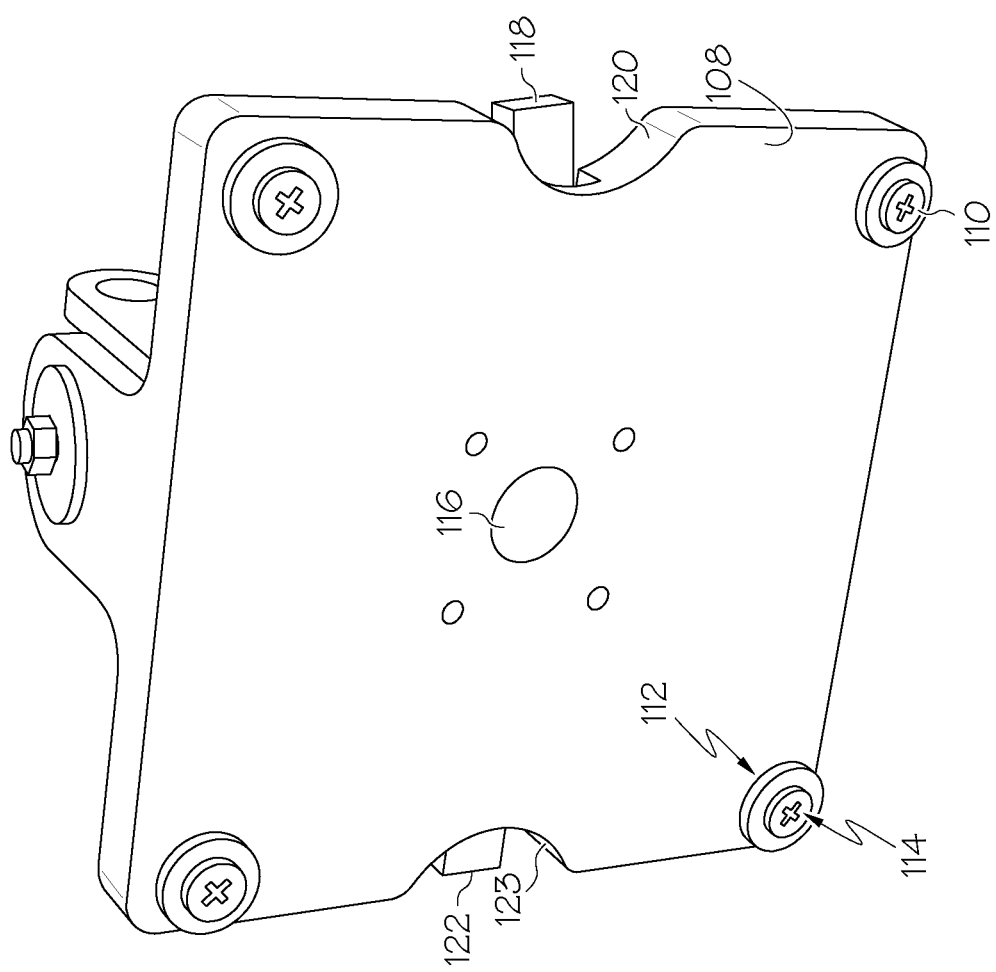

Referring also to FIGS. 9-12 illustrating the mounting bracket 44 with the support arm 42 removed, the mounting bracket includes a mounting plate 104 and a swivel bracket assembly 106 mounted thereto. The mounting plate 104 includes an outer surface 107 facing away from the wall to which it is mounted and an inner surface 108 facing toward the wall to which it is mounted. Referring particularly to FIGS. 10 and 11, at the inner surface 108 are projections 110 that can be received within the slots 34 of the tracks 30 and 32 (FIG. 1). Each projection 110 includes a stem portion 112 and an enlarged head portion 114. As will be described in greater detail below, the head portions 114 are sized to be received through enlarged open regions of the slots 34 and to be captured behind necked-down regions of the slots, while the stem portions are sized to pass by the necked-down regions of the slots.

A locking projection 116 may be provided at the inner surface 108. The locking projection 116 may be biased (e.g., by a spring) toward an extended, lock position for engaging the associated track 30, 32 and locking the support arm assembly at a vertical position along the track 30, 32. The locking projection 116 may be retracted using a lever 118 operatively connected to the locking projection that can be moved away from the outer surface 107 manually. The extended position of the locking projection 116 is illustrated by FIG. 9 and the retracted position of the locking projection is illustrated by FIG. 10. As can be seen, a recessed access region 120 is provided for increased access to the lever. In some embodiments, a second lever 122 (and recessed region 123) may be provided at an opposite side of the mounting plate 104 in connection to the same locking pin or an additional locking pin to either allow the operator a choice in which lever 118 and 122 to use to retract the locking projection 116, for example, depending on accessibility of the levers 118 and 122 or to provide additional security before the mounting plate 104 can be released. For example, referring to FIGS. 23-25, in one illustration, a mounting bracket 344 may comprise a locking projection 320 that can only be retracted (to unlock the mounting bracket) when a lever 318 is actuated on both sides of the mounting bracket 344. Such an embodiment may provide for additional security by preventing unwanted movement of the mounting bracket when a single lever is accidentally actuated.

Figure 12:
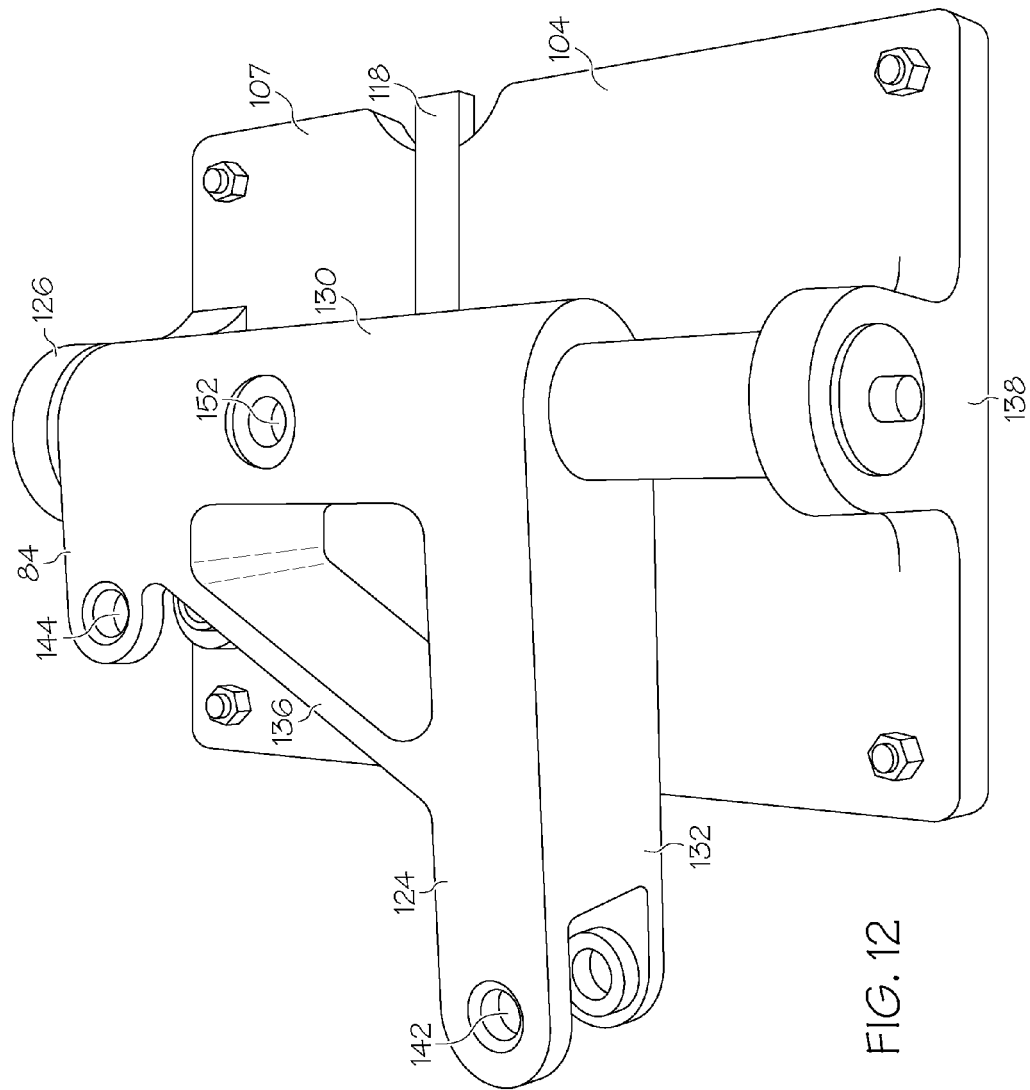
FIG. 12 is a perspective view of the illustrative mounting bracket of FIG. 9.

Referring now to FIGS. 9 and 12, the swivel bracket assembly 106 includes a pivot bracket 124 that is pivotally mounted to internal shaft that extends between two shaft mount arms 126 and 128. In some embodiments, the shaft mount arms 126 and 128 extend integrally outward from the outer surface 107 of the mounting plate 104. The pivot bracket 124 includes a vertical pivot member 130 having an opening extending therethrough that slidingly receives the internal shaft of the shaft mount arms 126 and 128. A lower arm support member 132 extends outwardly and integrally from the vertical pivot member 130 near the shaft mount arm 128. An upper arm support member 134 extends outwardly and integrally from the vertical pivot member 130 near the shaft mount arm 126. A cross bar 136 may extend from the lower arm support member 132 to the vertical pivot member 130 to provide additional load-bearing support for the lower arm support member.

Figure 13:
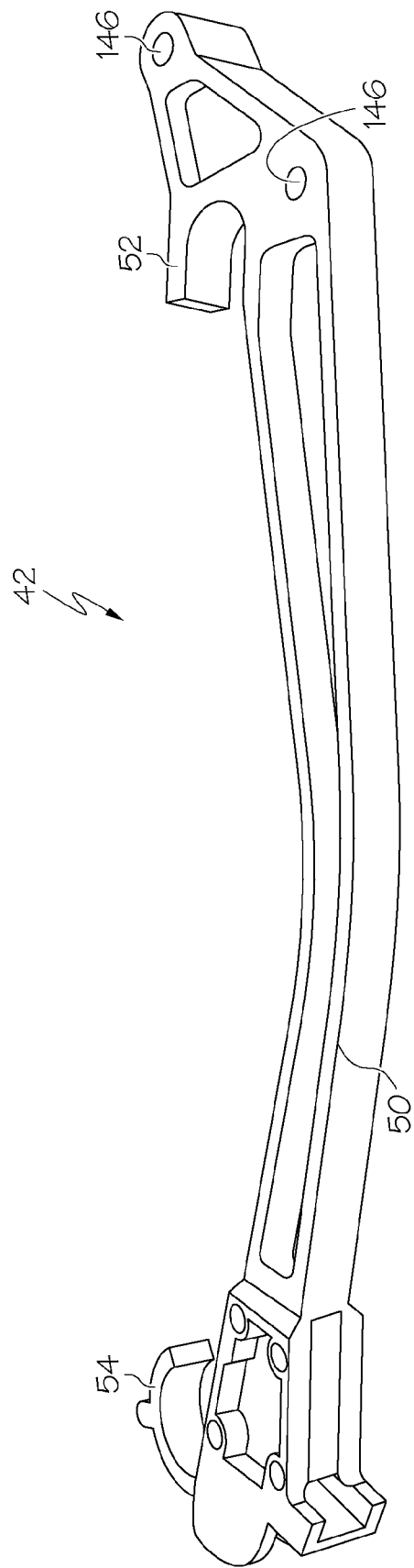
FIG. 13 is a perspective view of the illustrative support arm of the shock absorber litter support assembly of FIG. 3, wherein the support arm is shown disconnected from the mounting bracket.

Pins 138 and 140 may be provided to connect the support arm 42 to the pivot bracket 124 (see FIG. 4 also). The pins 138 and 140 may be removably received by openings 142 and 144 in the lower arm support member 132 and the upper arm support member 134, respectively. The support arm 42 has corresponding openings (see FIG. 13 illustrating opening 146) that align with the openings 142 and 144 in the lower and upper arm support members 132 and 134. Another pin 150 may be provided for locking the pivot bracket 124 relative to the mounting plate 104 thereby preventing rotation of the pivot bracket. Aligned openings (only opening 152 can be seen in FIG. 12) are provided in the vertical pivot member 130 and internal shaft for inserting the pin 150 therethrough. In some embodiments, the internal shaft may include multiple openings for locking the pivot bracket 124 in multiple positions such as the position of FIG. 9 and the position of FIG. 12. FIG. 12 illustrates the pivot bracket 124 pivoted toward a side of the mounting plate 104 while FIG. 9 illustrates the pivot bracket 124 locked in a forward position. As another embodiment, referring to FIG. 14, the vertical pivot member 130 may include multiple openings (see also opening 153) that may be used to lock the pivot bracket 124 in multiple positions.

Figure 23:
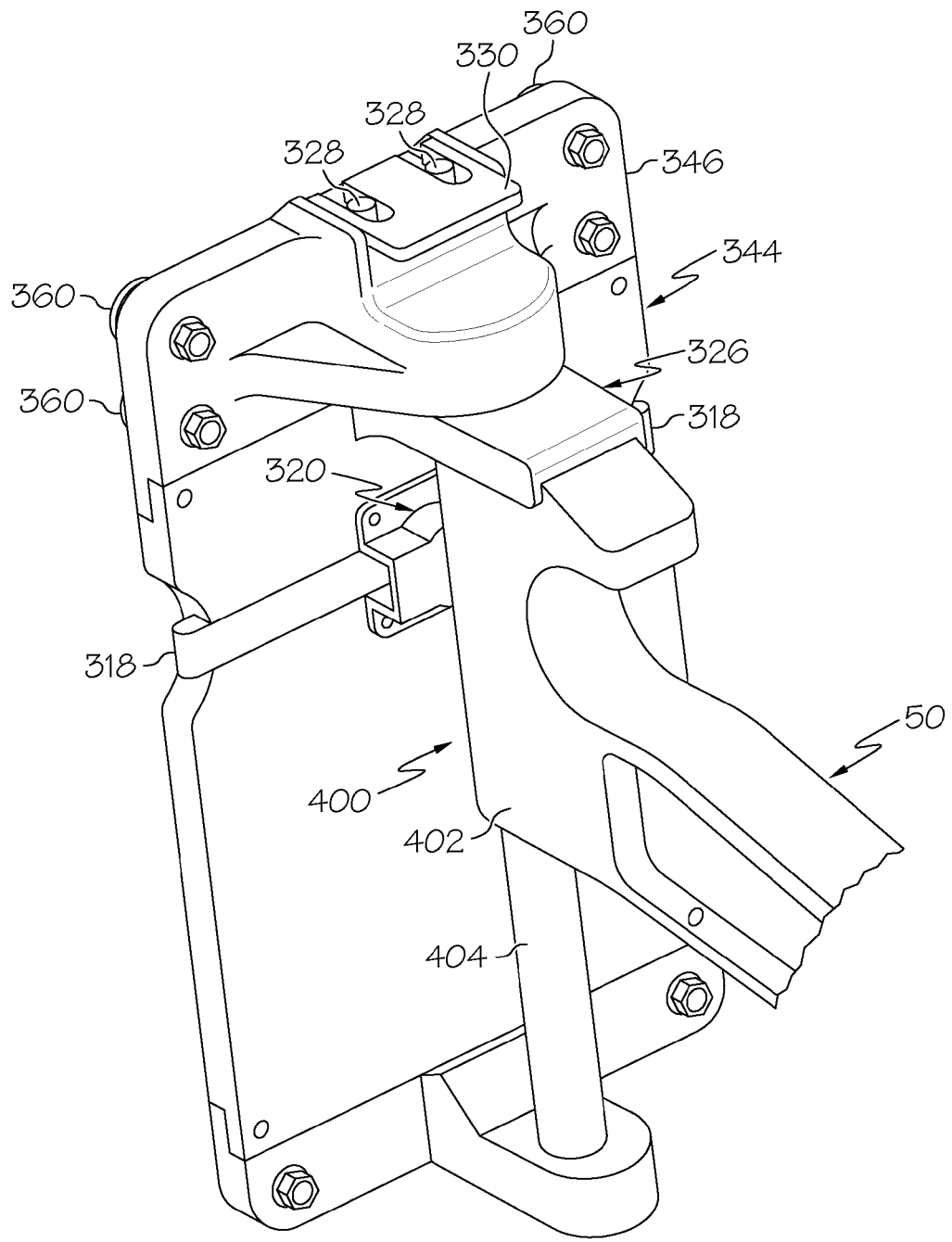
FIG. 23 is a perspective view of another illustrative mounting bracket and shock absorber litter support arm assembly.
Figure 24:
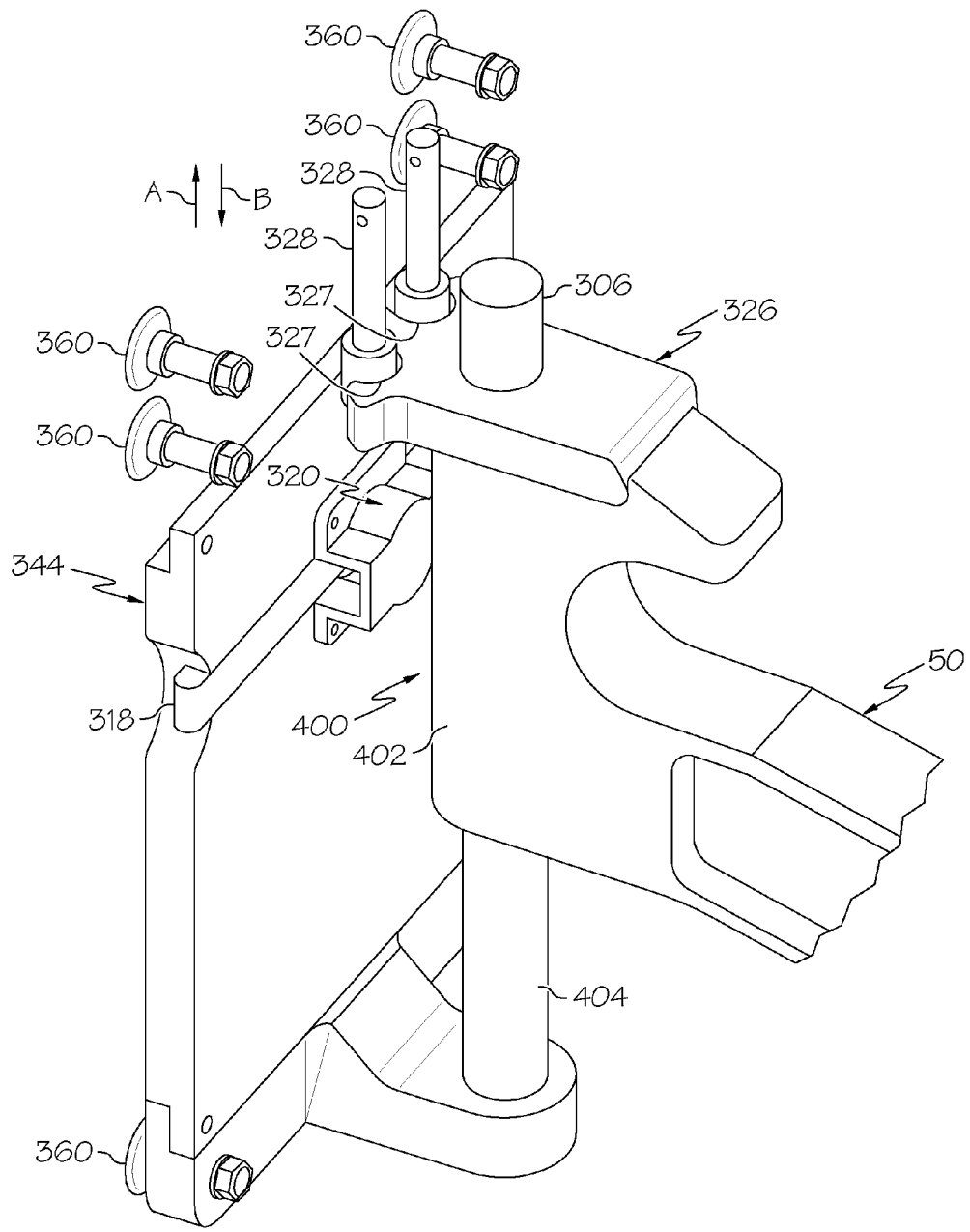
FIG. 24 is a side perspective view of another illustrative mounting bracket and shock absorber litter support arm assembly, wherein the support arm is in a support configuration.
Figure 25:
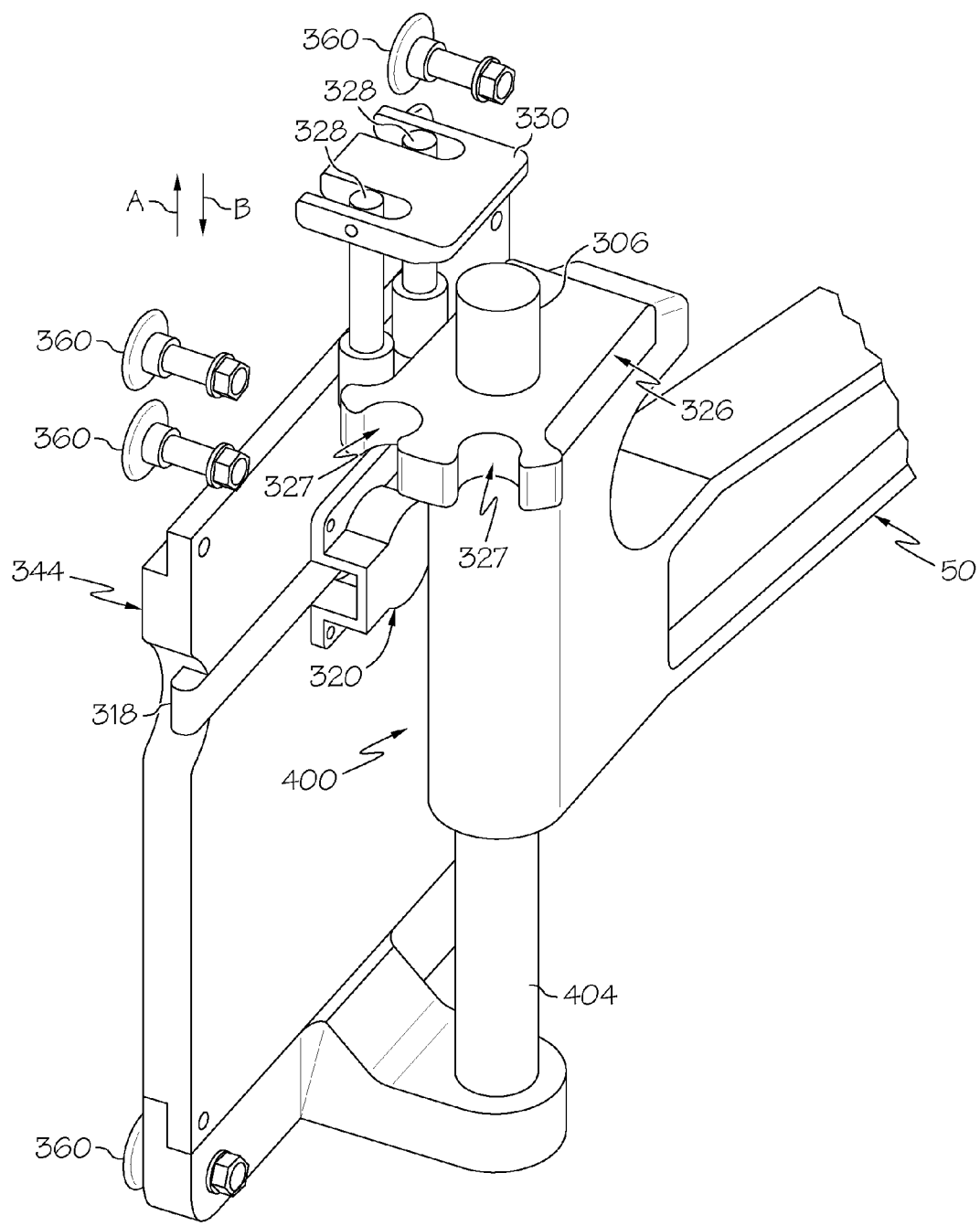
FIG. 25 is a side perspective view of the illustrative mounting bracket and shock absorber litter support arm assembly of FIG. 24, wherein the support arm is in a stow configuration.

Referring now to FIGS. 23-25, in another embodiment, a paddle latch pivot bracket 326 may be provided for releasable locking the rotational movement of the arm portion 50 relative the mounting bracket 344. FIG. 23 depicts a paddle latch pivot bracket 326 with a face plate 346. FIGS. 24 and 25 depict a paddle latch pivot bracket 326 with the faceplate 346 removed to better show the pivot pin 306 and the one or more recesses 327 as well as the locking pins 328. The paddle latch pivot bracket 326 may be mounted to or otherwise secured with a pivot pin 306 (which enables rotational movement of the arm portion 50). The paddle latch pivot bracket 326 may comprise one or more recesses 327 that are configured to removably receive one or more locking pins 328. A release plate 330 may be attached to the one or more locking pins 328 and allow for the movement of the locking pins 328 in the upward direction A out of the recesses 327 and in the downward direction B into the recesses 327. For example, as best illustrated in FIG. 24, when the locking pins 328 are disposed within the recesses 327 of the paddle latch pivot bracket 326, the locking pins 328 prevent rotational movement of the paddle latch pivot bracket 326 which in turn prevents rotational movement of the mounting arm 50 relative the mounting bracket 344. As best illustrated in FIG. 25, an operator may then actuate the release plate 330 to lift the locking pins 328 out of the recesses 327 in the upward direction A. The removal of the one or more locking pins 328 from the one or more recesses allows for uninhibited movement of the paddle latch pivot bracket 326 and the mounting arm 50. The locking pins 328 may then be lowered in the downward direction B to re-engage the one or more recesses 327 and thereby prevent rotational movement of the mounting arm 50. In one embodiment, the one or more locking pins 328 may be biased in the downward direction by a spring or the like. In such an embodiment, the one or more locking pins 328 may return to the one or more recesses once an operator releases the release plate 330. In another embodiment, the one or more locking pins 328 may only return to the one or more recesses 327 when the operator actuates the release plate in the opposite direction causing the one or more release pins to move in the downward direction B.

In one embodiment, the paddle latch pivot bracket 326 may be configured to provide a limited number of rotational positions in which the locking pins secure the paddle latch pivot bracket 326 in place. For example, the paddle latch pivot bracket 326 may be secured in either a support position wherein the arm portion 50 is substantially perpendicular with a wall such that a litter may be supported thereon (as illustrated in FIG. 24) or in a stored position wherein the arm portion 50 is substantially parallel with a wall (as illustrated in FIG. 25). The one or more recesses 327 may be configured to receive the one or more locking pins 328 when the arm portion 50 is fully rotated into one of those specified positions. However, when the arm portion is disposed in an in-between position, the one or more recesses may be out of alignment with the one or more locking pins preventing the locking pins 328 from locking the arm portion 50 in place. Such an embodiment may allow for the arm portion 50 to be locked into one of a limited number of positions to ensure a proper and consistent operation is maintained. The number of recesses 327 of the paddle latch pivot bracket 326 may be increased or decreased to adjust the number of fixed positions the arm portion 50 may be locked into via the locking pins 328.

Referring back to FIGS. 4 and 9-12, in some embodiments, the pins 138, 140 and 150 may each include a locking feature for inhibiting unintended removal of the pins. In the illustrated embodiment, each pin 138, 140 and 150 may include retractable locking features, such as ball bearings 156 located at an end of each pin. The ball bearings 156 may be sized to interfere with retraction of the pins 138, 140 and 150 from their respective openings. In some embodiments, a retraction mechanism, such as buttons 158, is provided that can be depressed to retract the ball bearings 156 and remove the pins 138, 140 and 150.

Removal of the pin 150 may allow for pivoting of the pivot bracket 124 and the support arm 42 mounted thereto side to side relative to the mounting plate 104. Removal of the pin 140 may allow for pivoting of the support arm 42 up and down relative to the pivot bracket 124 and the mounting plate 104. In these embodiments where the support arm 42 may pivot up and down, a shaft 164 of the pin 138 may be used as a pivot shaft about which the support arm 42 can pivot up and down with the pin 140 removed. FIG. 4 illustrates an example of a downwardly pivoted support arm. For example, it may be desirable to pivot the support arm 42 downward relative to the pivot bracket 124 for stowing the support arm 42 when not in use. Any suitable stowing features such as clasps, latches, ties, fasteners, etc., may be used to secure the support arm 42 in the stowed position against and/or to the track 30 and 32.

Figure 15:
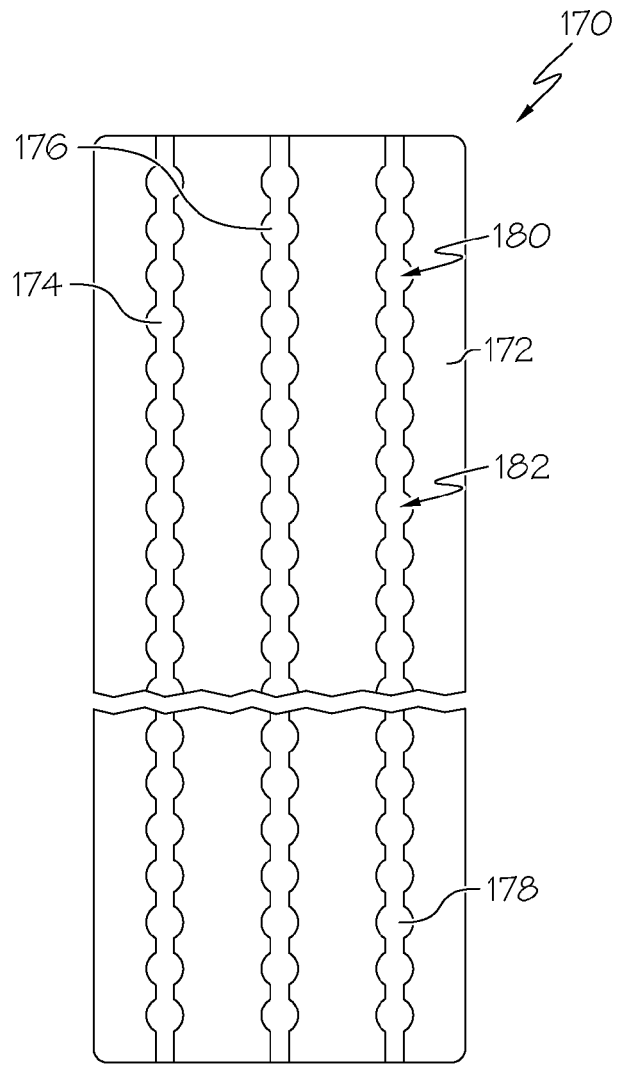
FIG. 15 is a front view of an illustrative track for use in the litter support assembly of FIG. 1.
Figure 16:
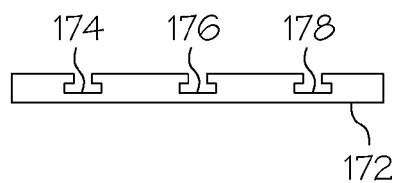
FIG. 16 is an end view of the illustrative track of FIG. 15.

Referring to FIGS. 15 and 16, an exemplary embodiment of a track 170 for use in the track system 20 or similar track system is illustrated. While two or more tracks 170 may be used in the track system 20 as illustrated by FIG. 1, only one track will be described as multiple tracks of the same track system may have the same or substantially the same features. The track 170 includes a backing plate 172 that may have an elongated, rectangular shape (or any other suitable shape) and three slots 174, 176 and 178 extending along the length of the backing plate and substantially parallel to each other. Each slot 174, 176 and 178 may have a series of enlarged open regions 180 that are adjacent to necked-down regions 182. In some embodiments, the enlarged open regions 180 are symmetrical such that they are spaced equidistant apart and are aligned in widthwise rows along the length of the backing plate 172. As another example, the enlarged open regions 180 of one or more of the slots 174, 176 and 178 may not all be equidistant and/or may not be aligned in rows with the other enlarged open regions of the other slots.

Figure 14:
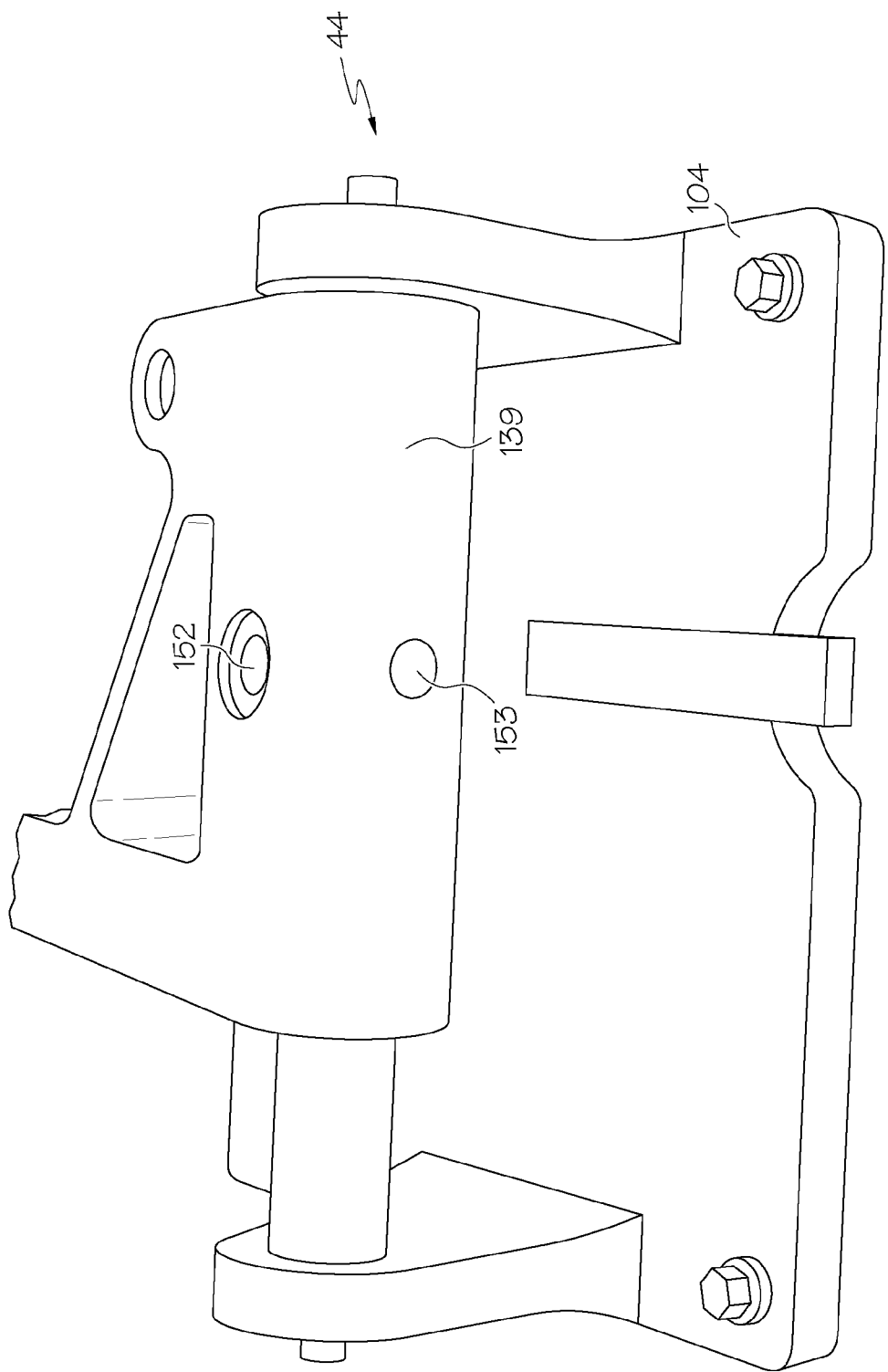
FIG. 14 is a side perspective view of the illustrative mounting bracket of FIG. 6.
Figure 17:
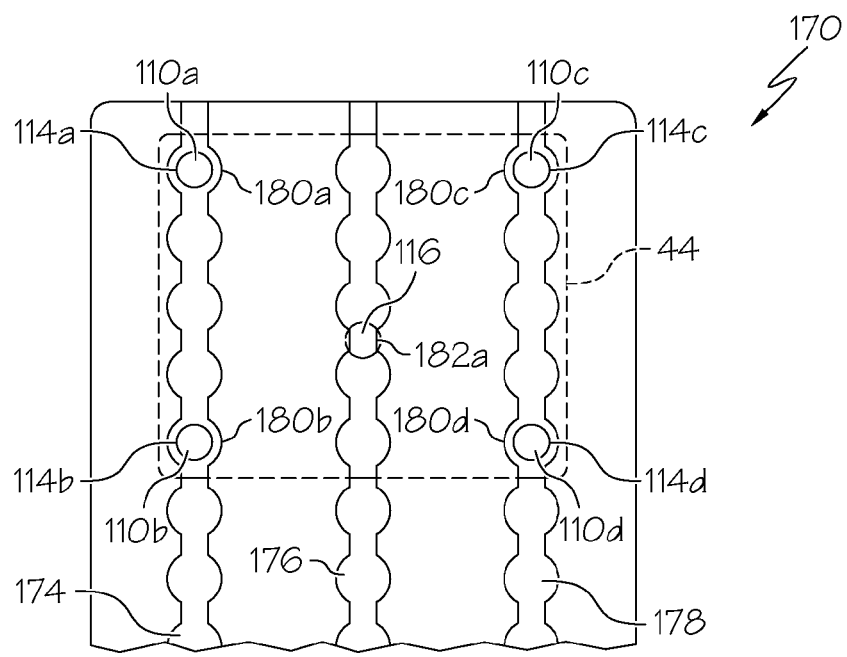
FIGS. 17 and 18 illustrate interaction between the track of FIG. 15 and the mounting bracket of FIG. 9.
Figure 18:
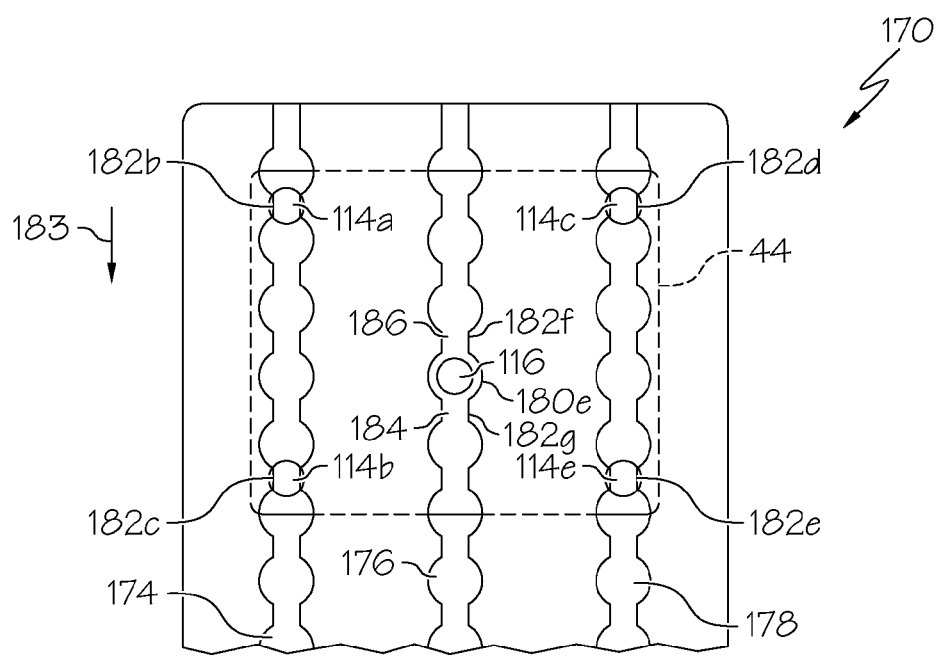

Referring to FIGS. 17 and 18, the track 170 and the mounting bracket 44 provide an out-of-phase configuration that is used to lock the mounting bracket to the track. Referring to FIG. 14, when the enlarged head portions 114a, 114b, 114c and 114d of the projections 110a, 110b, 110c and 110d of the mounting bracket 44 are inserted within the enlarged open regions 180a, 180b, 180c and 180d of the slots 174 and 178, the locking projection 116 is prevented from entering the slot 176 due to its alignment with the necked-down region 182a. In some embodiments, placing the enlarged head portions 114a, 114b, 114c and 114d in the slots 174 and 178 causes the locking projection 116 to retract from its outwardly biased, extended position. Referring to FIG. 18, the stem portions 112 of the projections 110a, 110b, 110c and 110d are sized to slide through the necked down regions 182 while the enlarged head portions 114a, 114b, 114c and 114d remain in the slots 174 and 178. Movement of the mounting bracket 44 downwardly in the direction of arrow 183 aligns the enlarged head portions 114a, 114b, 114c and 114d with necked-down regions 182b, 182c, 182d and 182e of the slots 174 and 178 and aligns the locking projection 116 with the enlarged open region 180e of the slot 176. The width of the locking projection 116 may be greater than the passageways 184 and 186 through the necked-down regions 182f and 182g adjacent the enlarged open region 180e, which prevents further movement of the mounting bracket 44 once the locking projection passes through the enlarged open region 180e and into the slot 176. In embodiments where the locking projection 116 is biased toward its extended position, the locking projection may snap into its extended position automatically once the locking projection is aligned with the enlarged open region 180e. An operator can retract the locking projection 116 out of the slot 176 by actuating the lever 118 as described above and again move the mounting bracket 44 along the track 170 to a different elevation.

While FIGS. 17 and 18 illustrate a mounting bracket being secured to the track using four projections 110a, 110b, 110c, and 110d and one locking projection 116, it should be appreciated that any other number of projections and locking projections may alternatively be employed. For example, as illustrated in FIG. 23-25, in one embodiment the mounting bracket 344 may use six projections 360 wherein two projections 360 are disposed on a bottom portion and four projections 360 are disposed on a top portion. Such an embodiment may allow for a secured connection under increased loads by providing more points of contact between the mounting bracket 344 and the track. In another embodiment, the mounting bracket may incorporate eight projections evenly distributed about the mounting bracket. In yet another embodiment, any other number of projections may be disposed on the mounting bracket that allows for a releasable connection with the track.

Referring to FIG. 19, as an alternative to the track 170, an exemplary mounting plate 190 may be used to mount the mounting bracket 44 of the arm support assembly 40 to a wall. The mounting plate 190 may include any suitable mount structure for mounting to a wall. The mounting plate 190 includes slots in the form of keyhole slots 192, 194, 196 and 198 that have an enlarged portion 200 and a necked-down portion 202. The enlarged portions 200 of the keyhole slots 192, 194, 196 and 198 are sized and arranged to receive the enlarged head portions 114 therethrough and the necked-down portions 202 are sized to allow the stem portions 112 to slide therein with the enlarged head portions captured within the keyhole slots. An opening 204 may be provided that is sized to receive the locking projection 116 when the locking projection is aligned with the opening 204.

FIGS. 20 and 21 illustrate locking the mounting bracket 44 to the mounting plate 190. In FIG. 17, the enlarged head portions 114 are inserted into the enlarged portions 200 of the keyhole slots 192, 194, 196 and 198, which may retract the locking projection 116. Referring to FIG. 18, the mounting bracket 44 may then be moved in a downward direction to place the enlarged head portions 114 behind the necked-down portions 202 and to extend the locking projection 116 into the opening 204 thereby locking the mounting bracket 44 to the mounting plate 190. In some embodiments, the mounting plate 190 may be fixedly mounted to a wall along with other mounting plates 190 to provide the mounting structure for the arm support assemblies 40.

Figure 22:
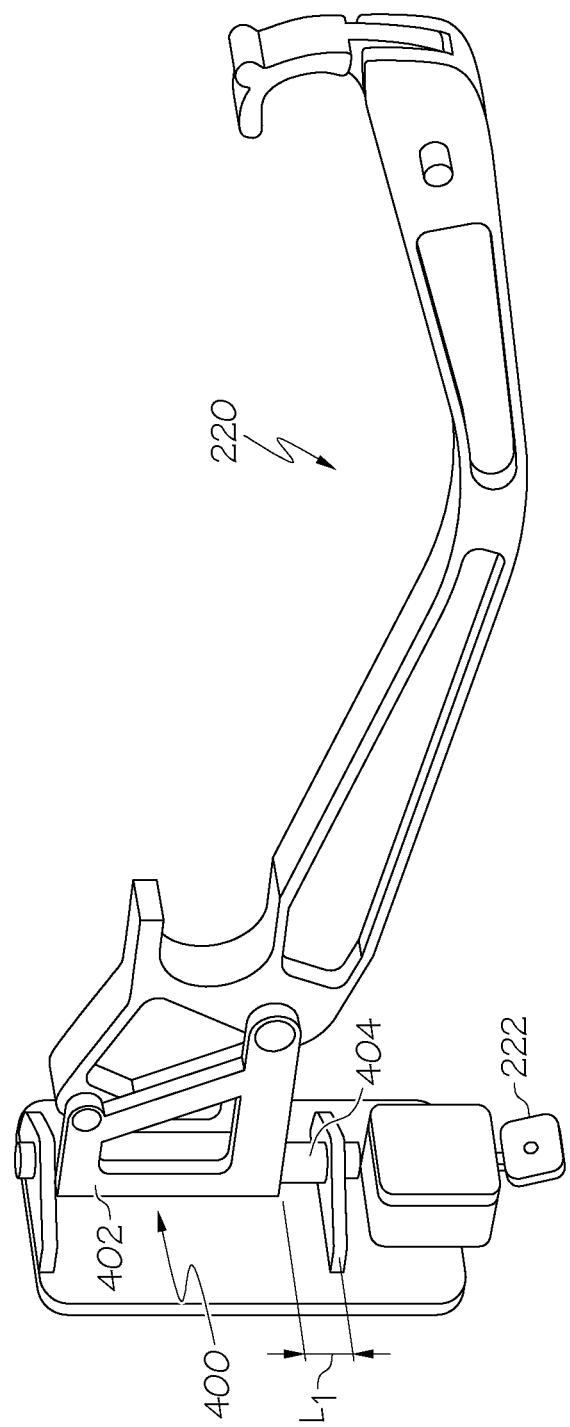
FIG. 22 illustrates another illustrative shock absorber litter support arm assembly and shock absorber litter support arm assembly.

Referring to FIG. 22, another embodiment of a support arm assembly 220 includes many of the features described above with reference to support arm assembly 40. In this embodiment, a release trigger 222 is provided for releasing a locking projection (not shown) so that the support arm assembly 220 can be moved up and down the track 30 in a fashion similar to that described above.

The support arm and mounting bracket may comprise a variety of configurations that allow for supporting a litter thereon. For example, referring to FIG. 24, in one embodiment, the support arm may comprise a horizontally low profile arm portion 351 that supports the litter closer to the wall and thereby limits the amount of space in the horizontal direction needed for the overall assembly. In such an embodiment, horizontally low profile mounting arm may comprise an interior hook assembly 355 without additional framework allowing the interior hook assembly 355 to be disposed closer to the wall. Pins 340 and 358 may then secure the horizontally low profile arm portion 351 to the mounting bracket 344 while multiple projections 360 secure the mounting bracket 344 to a wall until two release levers 318 are actuated as will become appreciated herein. Referring to FIG. 25, in another embodiment, the arm portion 50 may not comprise a low profile design but rather include additional trusses 356 for added support. The additional trusses 356 may allow for the arm portion 50 to support heavier loads. Referring to FIG. 26, in yet another embodiment, the support arm may comprise an alternative low profile arm portion 352 that provides for support of a litter in close proximity with a wall but still allows for supporting heavy loads by providing one or more trusses 357 along the length of the low profile arm portion 352. Furthermore, the mounting bracket 344 may provide additional projections 360 to provide additional support when carrying such heavy loads. In some embodiments, such as illustrated in FIG. 26, the arm portion 352 may further comprise a recession 358 between the mounting bracket 344 and the second hook 46. The recession 358 may provide a recess or dip in the arm portion 352 to accommodate litters with greater depths. For example, where a litter comprises a cross bar that bends downwardly towards the center, the recession 358 may accommodate the bent cross bar when a relatively straight arm portion 352 could not.

The litter support assembly 10 described above may provide a modular, adjustable litter support assembly, capable of planned or unplanned adjustments to accommodate a variety of emergency circumstances, whether foreseen or unforeseen. The litter support assembly 10 may provide a number of configurations for supporting one ore more litters carrying patients or other persons within vehicles and for stowing or even removing components of the support system when not in use. The litter support assembly 10 may adjust to accommodate litters of various sizes.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Versions of the devices described above may be actuated mechanically or electromechanically (e.g., using one or more electrical motors, solenoids, etc.). However, other actuation modes may be suitable as well including but not limited to pneumatic and/or hydraulic actuation, etc. Various suitable ways in which such alternative forms of actuation may be provided in a device as described above will be apparent to those of ordinary skill in the art in view of the teachings herein.

Versions of the devices described above may have various types of construction. By way of example only, any of the devices described herein, or components thereof, may be constructed from suitable metals, ceramics, plastics, or combinations thereof. Various suitable ways in which these and other modifications to the construction of devices described herein may be carried out will be apparent to those of ordinary skill in the art in view of the teachings herein.

For example, mobile mounted equipment in trucks, van, aircraft, space vehicles, rockets, missiles, or the like could be shock isolated using the mount of the present invention. Moreover, the mount could be used in any environment where shock is likely to be encountered, such as earthquake prone structures including buildings, bridges, etc. The invention can be drawn to a mount for isolating shipboard equipment from underwater shock Having shown and described various versions in the present disclosure, further adaptations of the devices and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A shock absorbing support arm assembly for a litter support assembly, the shock absorbing support arm assembly comprising:
   a support arm comprising a first end and a second end opposite the first end;
   a shock absorbing device connected to the second end of the support arm, the second end of the support arm being directly and rotatably mounted to an outer body of the shock absorbing device;
   a first pivot location which allows for the pivot of the support arm relative to a mounting bracket about an axis of the shock absorbing device between a stored position and a support position, and wherein the support arm may move along the axis relative to the mounting bracket;
   the mounting bracket connected to the shock absorbing device such that the support arm may move relative to the mounting bracket;
   wherein:
      the mounting bracket provides the support arm with a second pivot location which allows for the pivot of the support arm relative to the mounting bracket about a horizontal axis between lowered and raised positions, and wherein the mounting bracket comprises a hinge connected to the second end of the support arm, said hinge provides the horizontal axis; and
      a litter side shaft engagement mechanism disposed at the first end of the support arm.

2. The shock absorbing support arm assembly of claim 1, wherein the shock absorbing device is selected from the group consisting of a pneumatic shock absorber, hydraulic shock absorber, absorbent material shock absorber, electro-rheological fluid damper, magneto rheological damper, Eddy current damper, composite hydro-pneumatic device, and combinations thereof.

3. The shock absorbing support arm assembly of claim 1, wherein the shock absorbing device comprises a pneumatic shock absorber.

4. The shock absorbing support arm assembly of claim 1, wherein the shock absorbing device is positioned along the shock absorbing support arm assembly such that a longitudinal axis of the shock absorbing device is substantially parallel to a vehicle wall that the support arm is adapted to be mounted on.

5. The shock absorbing support arm assembly of claim 1, wherein the shock absorbing device comprises:
   an outer cylinder; and
   an inner rod partially encompassed by the outer cylinder;
   wherein the support arm is attached to the outer cylinder, the support arm and outer cylinder move along a longitudinal axis of the inner rod and relative to the inner rod, and the support arm and outer cylinder pivot about the inner rod.

6. The shock absorbing support arm assembly of claim 5, wherein the inner rod is connected to a piston, and the piston is disposed and movable within the outer cylinder.

7. The shock absorbing support arm assembly of claim 6, wherein the outer cylinder is filled with a shock dampening material selected from the group consisting of oils, air, gases, water hydraulic fluids, viscous fluids, oleo, foams, springs, resilient materials, shock absorbing materials, metal fillings with a magnet, magnets, electro-magnets, and combinations thereof.

8. The shock absorbing support arm assembly of claim 1, wherein the litter side shaft engagement mechanism comprises a hook that is adjustable relative to the support arm between open and closed positions for securing side shafts of various litters.

9. The shock absorbing support arm assembly of claim 8, wherein the litter side shaft engagement mechanism comprises a ratchet assembly connected thereto, the ratchet assembly enabling the hook to be adjustable between the open and closed positions.

10. The shock absorbing support arm assembly of claim 1, further comprising a second litter side shaft engagement mechanism disposed along the support arm near the second end.

* * * * *